(12) United States Patent
Hashimoto

(10) Patent No.: US 8,312,527 B2
(45) Date of Patent: Nov. 13, 2012

(54) AUTHENTICATION SYSTEM AND METHOD INCLUDING IMAGE FORMING APPARATUS

(75) Inventor: Hiroshi Hashimoto, Tokyo (JP)

(73) Assignee: Canon Kabuhsiki Kaisha, Tokyo (JP)

( * ) Notice: Subject to any disclaimer, the term of this patent is extended or adjusted under 35 U.S.C. 154(b) by 195 days.

(21) Appl. No.: 12/529,758

(22) PCT Filed: Sep. 18, 2008

(86) PCT No.: PCT/JP2008/067375
§ 371 (c)(1),
(2), (4) Date: Sep. 3, 2009

(87) PCT Pub. No.: WO2009/038226
PCT Pub. Date: Mar. 26, 2009

(65) Prior Publication Data
US 2010/0050247 A1   Feb. 25, 2010

(30) Foreign Application Priority Data

Sep. 18, 2007  (JP) ................. 2007-241391
Jul. 31, 2008  (JP) ................. 2008-198164

(51) Int. Cl.
*G06F 7/04* (2006.01)
(52) U.S. Cl. ......... 726/10; 726/2; 726/3; 726/7; 726/21; 713/156; 713/157; 713/158
(58) Field of Classification Search .............. 726/10, 726/21, 7
See application file for complete search history.

(56) References Cited

U.S. PATENT DOCUMENTS

| 2007/0101415 A1 | 5/2007 | Masui | 726/5 |
| 2007/0136820 A1 | 6/2007 | Saito | 726/27 |
| 2008/0127332 A1* | 5/2008 | Kawai | 726/21 |
| 2009/0025072 A1* | 1/2009 | Kondo | 726/7 |

FOREIGN PATENT DOCUMENTS

| JP | 2006-099714 | 4/2006 |
| JP | 2007-079857 | 3/2007 |
| JP | 2007-128208 | 5/2007 |
| JP | 2007-179197 | 7/2007 |

* cited by examiner

*Primary Examiner* — Nathan Flynn
*Assistant Examiner* — Phuoc Tran
(74) *Attorney, Agent, or Firm* — Fitzpatrick, Cella, Harper & Scinto

(57) ABSTRACT

The present invention enables any authentication for a plurality of authentication methods with an authentication server for storing management data on a user. The present invention uses one of set information for logging in with an IC card and user input information from operation means in the case of logging in to a directory server; requests the directory server from a Kerberos authentication operation part for a service ticket; requests the directory server from an LDAP communication operation part for authentication with the service ticket obtained by the relevant request; and requests the directory server from the authentication processing functioning part for a search for granting use of the relevant MFP to a user with one of card information read by a card reader and a user name of user input information in the case where authentication to the directory server by the relevant request is successful.

10 Claims, 27 Drawing Sheets

FIG. 6

<CARD INFORMATION>

| CARD ID | 0123456789 |
|---|---|

FIG. 7

<SET INFORMATION>

| DOMAIN | meap. dsf4. canon. local |
|---|---|
| HOST | dc |
| USER NAME | canon |
| PASSWORD | ******** |

FIG. 8

<USER INPUT INFORMATION>

| DOMAIN | dsf4. canon. local |
|---|---|
| USER NAME | canon |
| PASSWORD | ******** |

FIG. 9

<SERVICE TICKET>

| SERVICE TICKET | <ENCRYPTED DATA> |
|---|---|

FIG. 10

<MANAGEMENT DATA>

| USER NAME | user1 |
|---|---|
| DISPLAY NAME | USER 1 |
| MAIL | user1@meap. dsf4. canon. local |
| GROUP | Canon Peripheral Admins |
| EXTENDED ATTRIBUTE | 0123456789 |

FIG. 11

<MFP LOGIN USER INFORMATION>

| USER NAME | user1 |
|---|---|
| DISPLAY NAME | USER 1 |
| DOMAIN | meap. dsf4. canon. local |
| MAIL | user1@meap. dsf4. canon. local |
| AUTHORIZATION | Administrator |

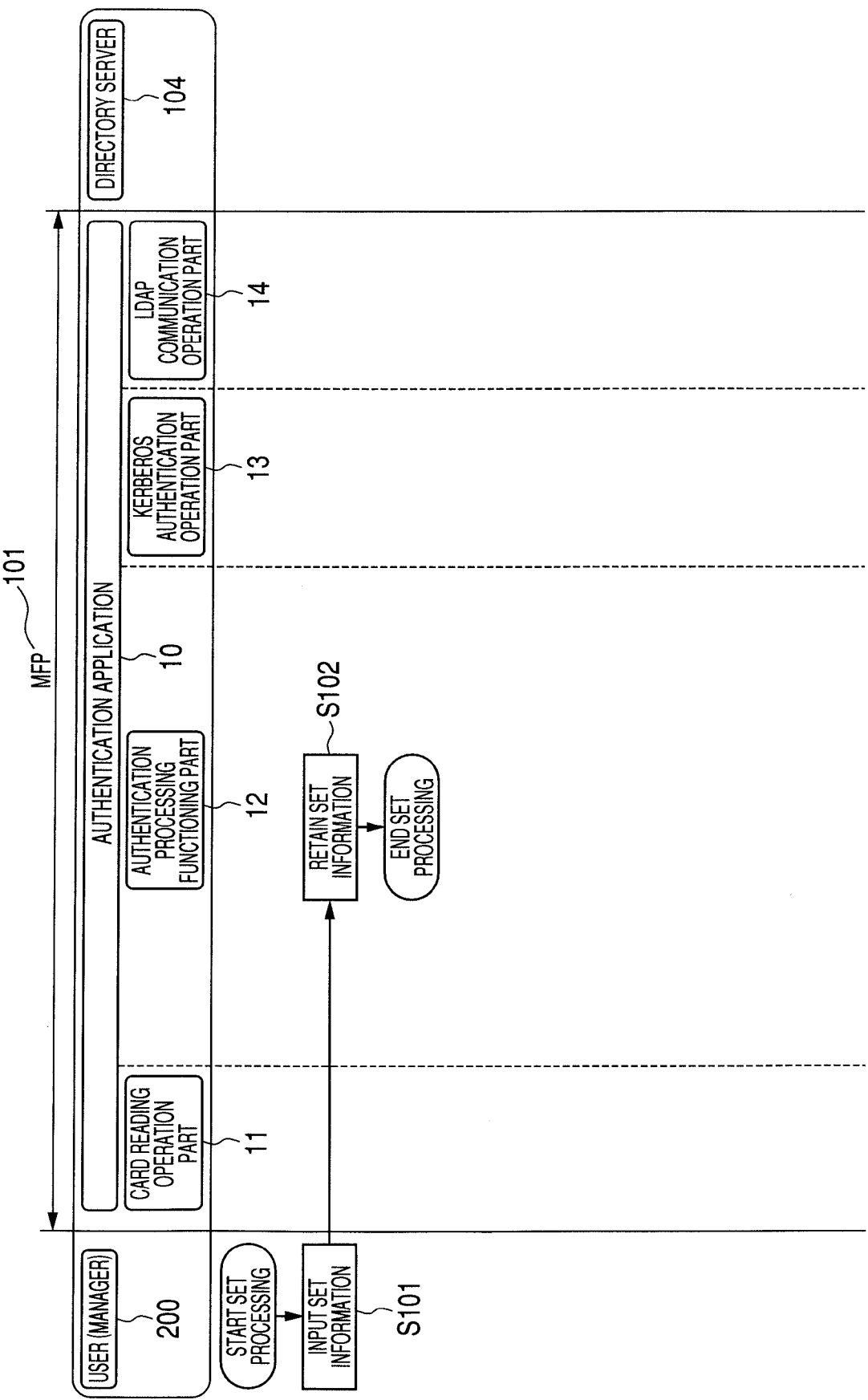

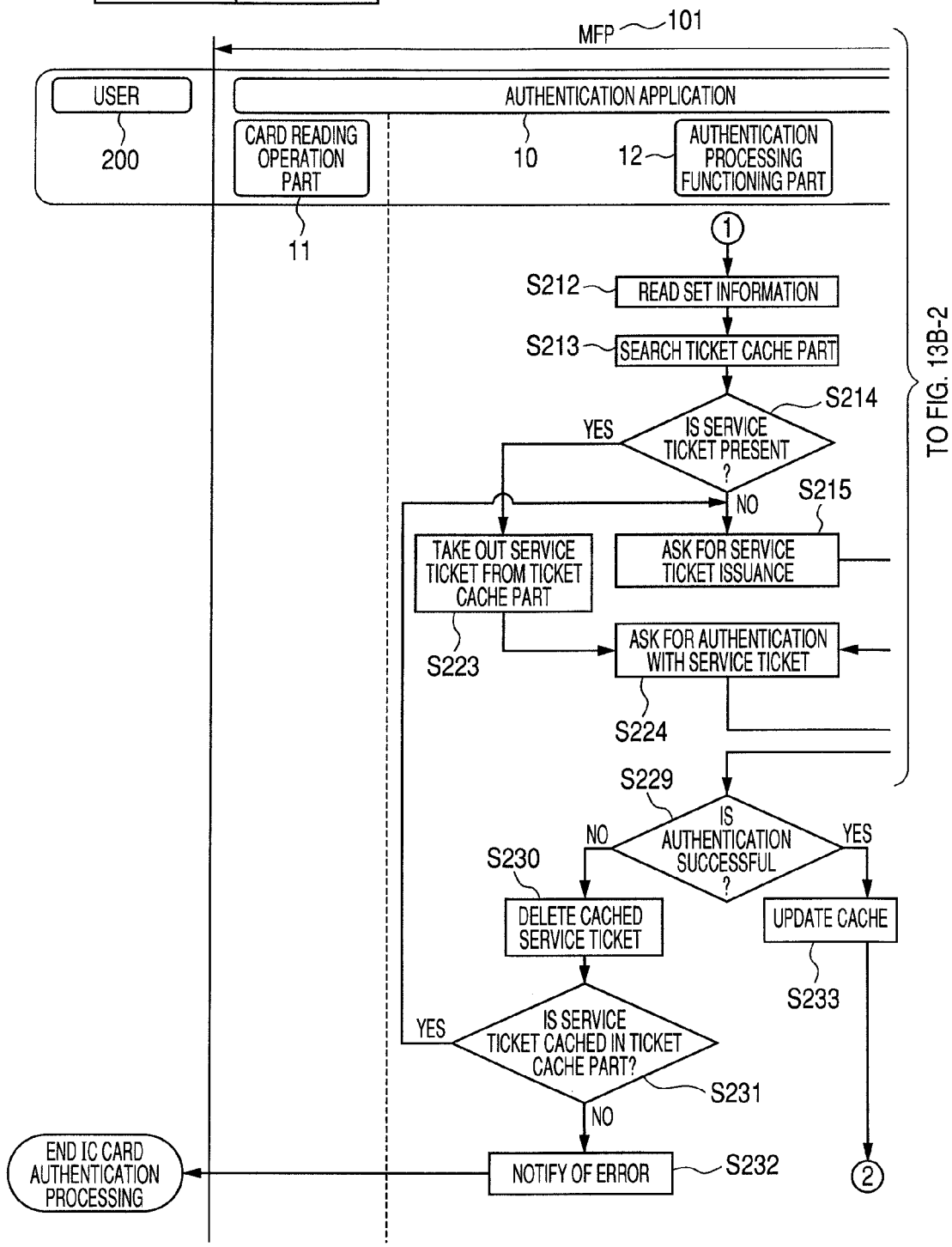

FIG. 14

<SERVICE TICKET CACHE>

| NUMBER | KEY | SERVICE TICKET |
|---|---|---|
| 1 | fb46831582b14b6ebee3 | <ENCRYPTED DATA> |
| 2 | 2a598338943249cca5b1 | <ENCRYPTED DATA> |
| 3 | 024aedbe57cf4d94a834 | <ENCRYPTED DATA> |
| 4 | ---------------- | ---------------- |
| 5 | ---------------- | ---------------- |
| 6 | ---------------- | ---------------- |
| 7 | ---------------- | ---------------- |
| 8 | ---------------- | ---------------- |
| 9 | ---------------- | ---------------- |
| 10 | ---------------- | ---------------- |

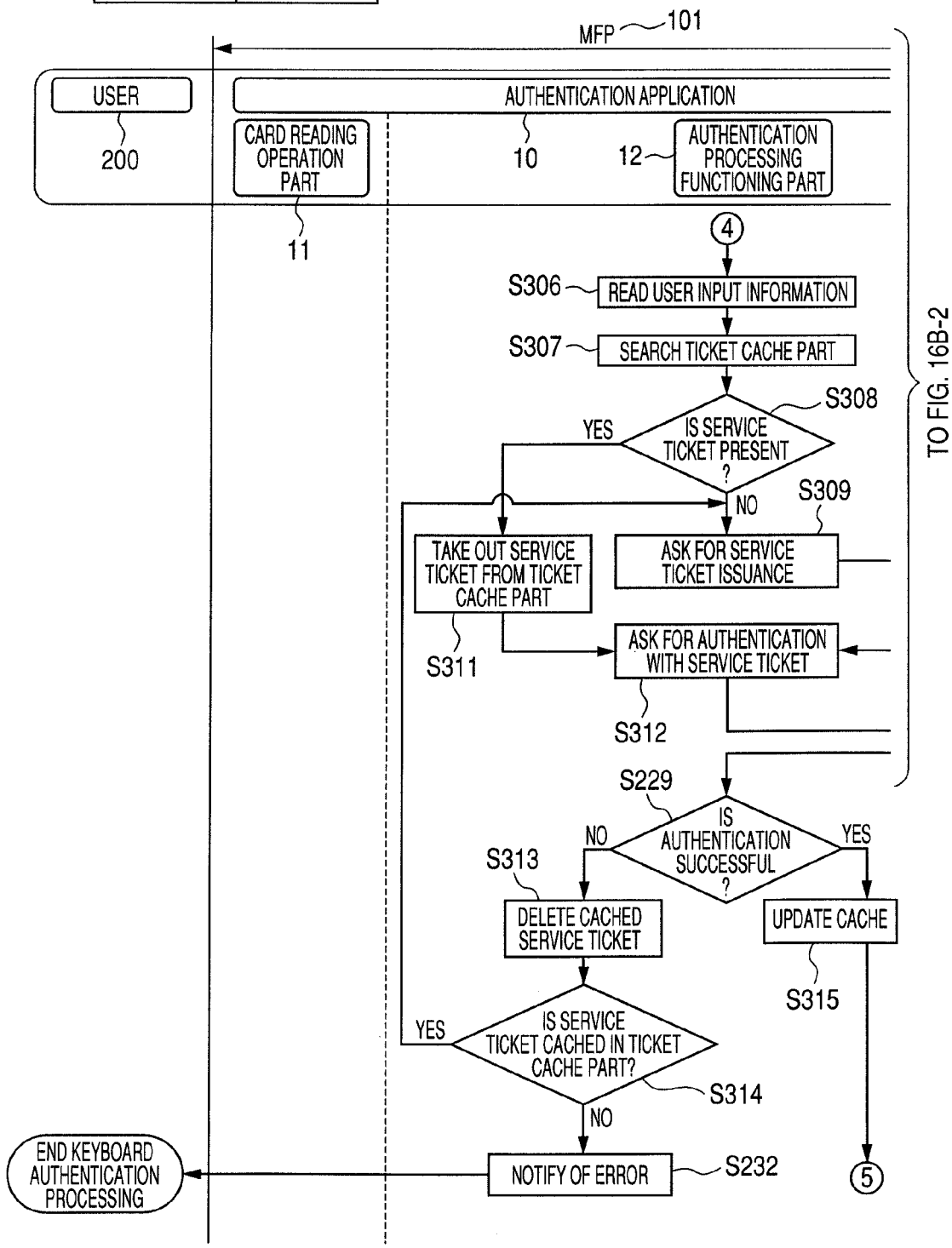

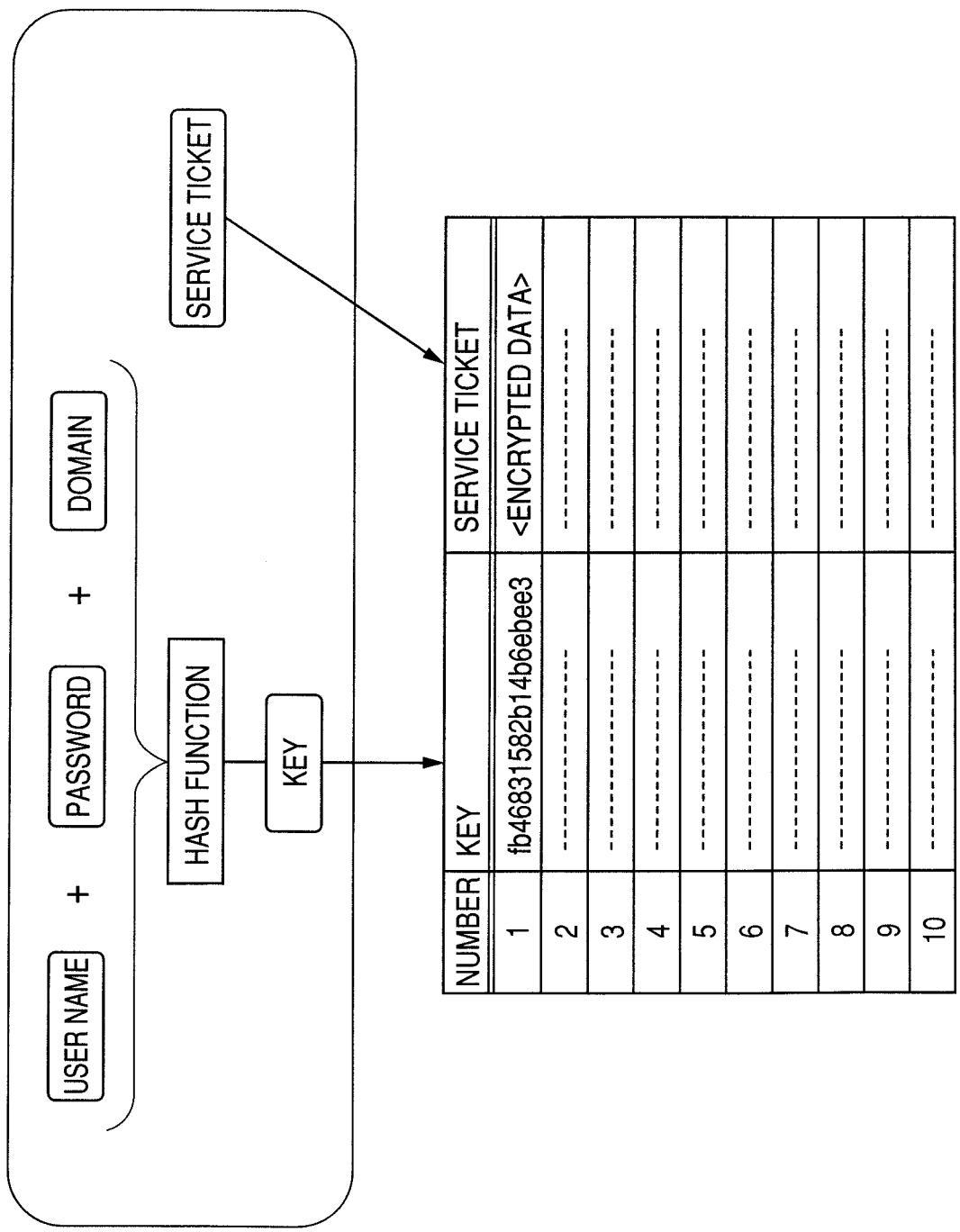

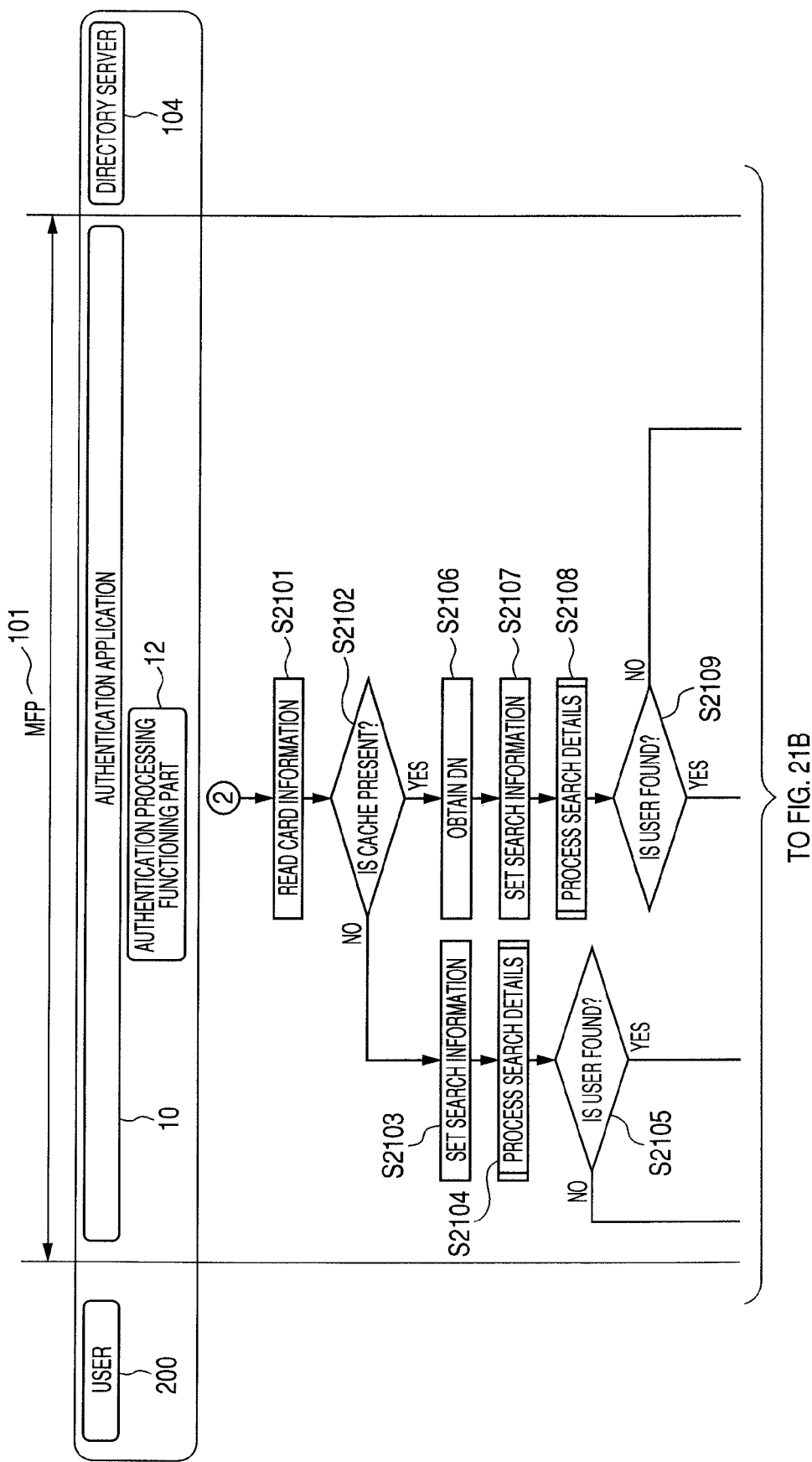

FIG. 23

<DN CACHE>

| CARD ID | USER DN |
|---|---|
| 2222222222 | CN=user2, OU=dept1, OU=div1, DC=com2, DC=local |
| ... | ... |
| ... | ... |
| ... | ... |

FIG. 24

<SEARCH INFORMATION>

| ITEM | CONTENT | |
|---|---|---|
| SEARCH CONDITIONS | ... | ~2401 |
| SEARCH POSITION | ... | ~2402 |
| ... | ... | |
| ... | ... | |

AUTHENTICATION SYSTEM AND METHOD INCLUDING IMAGE FORMING APPARATUS

TECHNICAL FIELD

The present invention relates to an image forming apparatus communicably connected to an authentication server, an authentication system including the authentication server and the image forming apparatus, an authentication method in the image forming apparatus, a program for causing a computer to execute the authentication method, and computer readable memory medium storing the program.

BACKGROUND ART

Currently, authentication technology of a composite machine (multifunctional peripheral, hereafter "MFP") using an IC card and authentication technology of an MFP using a keyboard are widely spread. Such an authentication system for an MFP uses an authentication server for collating information read from an IC card and information input by a keyboard.

The authentication server includes, for example, a method of producing its own authentication database inside the MFP to utilize the MFP itself as an authentication server, a method for establishing its own authentication server in the same network where the MFP is present, and a method for utilizing a directory server in operation in an existing authentication system.

For example, Japanese Patent Application Laid-Open No. 2006-099714 discloses a mechanism of utilizing both of its own authentication server and directory server. Specifically, in Japanese Patent Application Laid-Open No. 2006-099714, a held IC card information is read to make an inquiry on the IC card information to its own authentication server in the case of authentication (IC card authentication) with the IC card. If the IC card information is registered in a table on its own authentication sever, authentication is regarded as successful. If there is no registration, authentication is regarded as failure. In Japanese Patent Application Laid-Open No. 2006-099714, a user inputs a user name, a password, a login destination domain in the case of authentication with a keyboard (keyboard authentication). A directory server authenticates through a login service PC based thereon.

An authentication system for realizing the IC card authentication and the keyboard authentication in the above described prior arts will be described below.

FIG. 20 is a schematic diagram exemplifying a skeleton framework of an authentication system for realizing the IC card authentication and the keyboard authentication in the background art.

An authentication system illustrated in FIG. 20 includes an MFP 2010, an IC card authentication server 2020, a login service server 2030, a directory server 2040 and a network 105 communicably connecting those apparatuses.

The MFP 2010 includes an authentication application 20 including a card reading operation part 21, an authentication processing functioning part 22 and a login service connecting operation part 23, an operation part 330 including a keyboard and a card reader 340 for reading information of the IC card. The IC card authentication server 2020 includes an IC card authentication service part 2021 and an IC card authentication table memory 2022. The login service server 2030 includes a login service part 2031. The directory server 2040 includes an LDAP (Lightweight Directory Access Protocol) service part 2041 and a management data memory 2042.

For IC card authentication in the authentication system illustrated in FIG. 20, a user holds an IC card over the card reader 340 of the MFP 2010 at first. Then the card reading operation part 21 of the MFP 2010 controls the card reader 340 to obtain card information from the card. The card reading operation part 21 delivers the obtained card information to the authentication processing functioning part 22. The authentication processing functioning part 22 establishes connection to the IC card authentication service part 2021 of the IC card authentication server 2020 and then issues authentication request for card information to the IC card authentication service part 2021.

The IC card authentication service part 2021 receives the authentication request from the authentication processing functioning part 22 and searches for the relevant user 200 with an IC card authentication table stored in the IC card authentication table memory 2022. The IC card authentication service part 2021 replies to the authentication processing functioning part 22 with a search result. The authentication processing functioning part 22 delivers the search result to a control part of the MFP 2010 to carry out a login process to the MFP 2010 corresponding to the search result.

For keyboard authentication in the authentication system illustrated in FIG. 20, the user 200 inputs a user name, a password and login destination with a keyboard login screen in the operation part 330 of the MFP 2010 and pushes the login button down.

In that case, the authentication processing functioning part 22 of the MFP 2010 delivers user input information (a user name, a password and login destination) having been input from the operation part 330 to the login service connecting operation part 23 of the MFP 2010 to ask for authentication. The login service connecting operation part 23 takes the domain indicated in the user input information login destination and searches for the login service server 2030 with the relevant domain. Subsequently, the login service connecting operation part 23 establishes connection to the login service part 2031 of the searched login service server 2030 and delivers the user name and the password in the user input information to the relevant login service part 2031 to ask for authentication.

The login service part 2031 establishes connection to the LDAP service part 2041 starting up on the directory server 2040. Subsequently, the login service part 2031 logins the LDAP service part 2041 with a user name and a password having been set in advance. Subsequently, the login service part 2031 delivers the user name and the password of the user input information to the LDAP service part 2041.

The LDAP service part 2041 determines whether or not the user 200 is a valid user according to the user information, that is managed and stored by the management data memory 2042, and the user name and the password of the user input information. The LDAP service part 2041 replies to the login service part 2031 with the result of determination on validity of the user.

When the login service part 2031 receives the result of determination from the LDAP service part 2041 and replies to the login service connecting operation part 23 therewith, the login service connecting operation part 23 replies to the authentication processing functioning part 22 with the relevant determination result. When the authentication processing functioning part 22 receives the determination result from the login service connecting operation part 23 and delivers the determination result to a control part of the MFP 2010, the MFP 2010 undergoes login processing corresponding to the relevant determination result.

Thus, the authentication system for realizing IC card authentication and keyboard authentication described in the conventional example had to manage its own authentication server (IC card authentication server 2020) and the directory server 2040 and needed to mange both of the IC card authentication table memory 2022 and the management data memory 2042 as user information. Consequently, the operation management costs for the authentication system will increase, giving rise to a problem.

In order to solve this problem, it is considered, for example, that the directory server 2040 manages the IC card user information (IC card authentication table). However, the directory server 2040 searches for user information and, therefore, needs to login the relevant directory server 2040 once. Therefore, a user name and a password will be required. In this regard, the IC card authentication will need to store the password and the like in an IC card. Consequently, this case will give rise to a security problem. More in detail, the password stored in an IC card will be fixed in the case of utilizing medium such as an IC card where internal information is not changed regularly in spite that passwords are regularly changed for the purpose of security, giving rise a big security problem in this regard.

Moreover, the authentication system for realizing IC card authentication and keyboard authentication described in the conventional example requires a login service PC (login service server 2030) in the case of authentication for the directory server 2040. The operation management costs for the authentication system will increase also from this view point, giving rise to a problem. In addition, in order to solve this problem, it is considered that the MFP 2010 carries out the login service function. However, in this case, when the MFP 2010 being inferior to a PC in process speed directly communicates to the directory server 2040 to carry out authentication processing, authentication will take time due to that complicated process, giving rise to a problem.

DISCLOSURE OF THE INVENTION

According to the present invention, any authentication is made feasible for a plurality of authentication methods with an authentication server storing management data of a user.

According to the first aspect of the present invention, an image forming apparatus is provided for attaining the above described object. The image forming apparatus is communicably connected to an authentication server which stores user management information including at least user identifying information and user identification information for a user, and comprises a reading unit which reads user identifying information for identifying a user, a login information memory unit which stores first login information including at least common user identification information and a password for logging in to the authentication server used for authenticating the user identifying information read by the reading unit, an operation unit which accepts an input operation on second login information including at least user identification information and a password according to an operation by a user, a ticket request unit which requests for an authentication ticket utilized for authentication at an occasion of logging in to the authentication server with one of the first login information and the second login information in the case of logging in to the authentication server, an authentication request unit which requests authentication to the authentication server with an authentication ticket obtained by a request by the ticket request unit, and a search request unit which requests, to the authentication server, a search for user identification information on one of user identifying information read by the reading unit in order to search for the user management information and user identification information of the second login information in the case where authentication with the authentication ticket for the authentication server by a request by the authentication request unit is successful.

According to the second aspect of the present invention, an authentication system is provided which comprises the above described image forming apparatus, the authentication server, a print server for storing print data, and a print management server for generating print data list for each user, wherein the print management server outputs, to the image forming apparatus, a print data list of a user allowed to use the image forming apparatus in the authentication server at an occasion of carrying out print processing on print data stored in the print server.

Other features and advantages of the present invention will be apparent from the following description taken in conjunction with the accompanying drawings, in which like reference characters designate the same or similar parts throughout the figures thereof. The accompanying drawings, which are incorporated in and constitute a part of the specification, illustrate embodiments of the invention and, together with the description, serve to explain the principles of the invention.

BRIEF DESCRIPTION OF THE DRAWINGS

FIG. 6 is a schematic diagram exemplifying card information obtained by a card reading operation part of the MFP.

FIG. 7 is a schematic diagram exemplifying setting information being set by a set information part of the MFP.

FIG. 8 is a schematic diagram exemplifying user input information stored in a user input information part of the MFP.

FIG. 9 is a schematic diagram exemplifying data structure of a service ticket.

FIG. 10 is a schematic diagram exemplifying user management data stored in a management data memory of the directory server.

FIG. 11 is a schematic diagram exemplifying MFP login user information stored in an MFP login user information part of the MFP.

FIG. 12 is a flow chart exemplifying set process procedure in set information of an authentication system according to the first embodiment of the present invention.

FIGS. 13B-1 and 13B-2 is a flow chart exemplifying the process procedure in the IC card authentication of the authentication system according to the first embodiment of the present invention in succession to FIG. 13A.

FIG. 14 is a schematic diagram exemplifying data structure of service ticket cache in one of an IC card ticket cache part and a keyboard ticket cache part.

FIGS. 16B-1 and 16B-2 is a flow chart exemplifying the process procedure in the keyboard authentication of the authentication system according to the first embodiment of the present invention in succession to FIG. 16A.

FIG. 17 is a schematic diagram describing service ticket cache processing in one of an IC card ticket cache part and a keyboard ticket cache part.

FIG. 21 comprising FIGS. 21A and 21B is a flow chart exemplifying process procedure in IC card authentication of an authentication system according to a second embodiment of the present invention.

FIG. 23 is a schematic diagram exemplifying DN cache information being present inside a storage region managed by the authentication processing functioning part in FIG. 4, that is, an HDD in FIG. 3.

FIG. 24 is a schematic diagram exemplifying search information set in the authentication processing functioning part of the MFP.

BEST MODES FOR CARRYING OUT THE INVENTION

The best modes for carrying out the present invention will be described in detail with reference to the accompanying drawings.

First Embodiment

Figure 1:
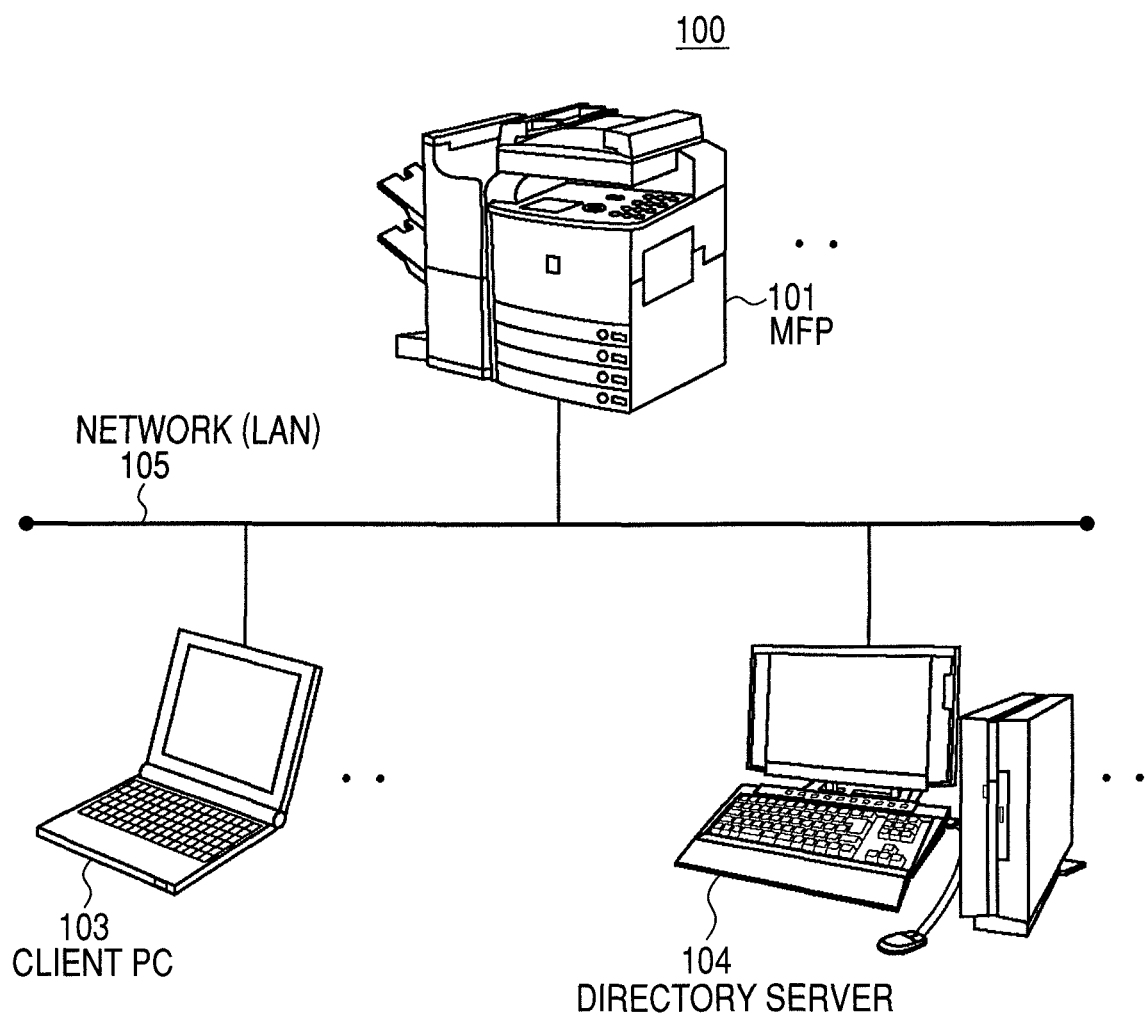
FIG. 1 is an appearance diagram exemplifying an authentication system according to a first embodiment of the present invention.

FIG. 1 is an appearance diagram exemplifying an authentication system according to a first embodiment of the present invention.

An authentication system 100 of the present embodiment illustrated in FIG. 1 includes an MFP 101, a client PC 103, a directory server 104, a network 105 including the LAN (Local Area Network) mutually communicably connecting those apparatuses. Here, the MFP 101 is installed in the network 105 in plurality and is installed in each floor of, for example, an office building. The client PC 103 is installed in the network 105 in plurality and one unit thereof is installed, for example, for each manager. The directory server 104 is installed in the network 105 in plurality and is installed at each base.

The MFP 101 is an image forming apparatus including function such as a printer, a photocopier and a facsimile.

The client PC 103 is a PC such as for setting the MFP 101 and is a PC with, for example, function capable of communicating to the MFP 101 by HTTP (Hyper Text Transfer Protocol) via the network 105 (for example, Internet Explorer (registered trademark) of Microsoft Corporation).

The directory server 104 is included in the authentication server according to the present invention.

Specifically, the directory server 104 stores and manages information on hardware resources such as a server present on the network 105, the client PC 103 and the MFP 101, attributes of users thereof (for example, login user name and password for Windows (registered trademark) of Microsoft Corporation) and access rights in an integrated fashion and is, for example, a server with an active directory (Active Directory (registered trademark)) function.

A hardware framework applicable to the client PC 103 and the directory server 104 illustrated in FIG. 1 will be described below.

Figure 2:
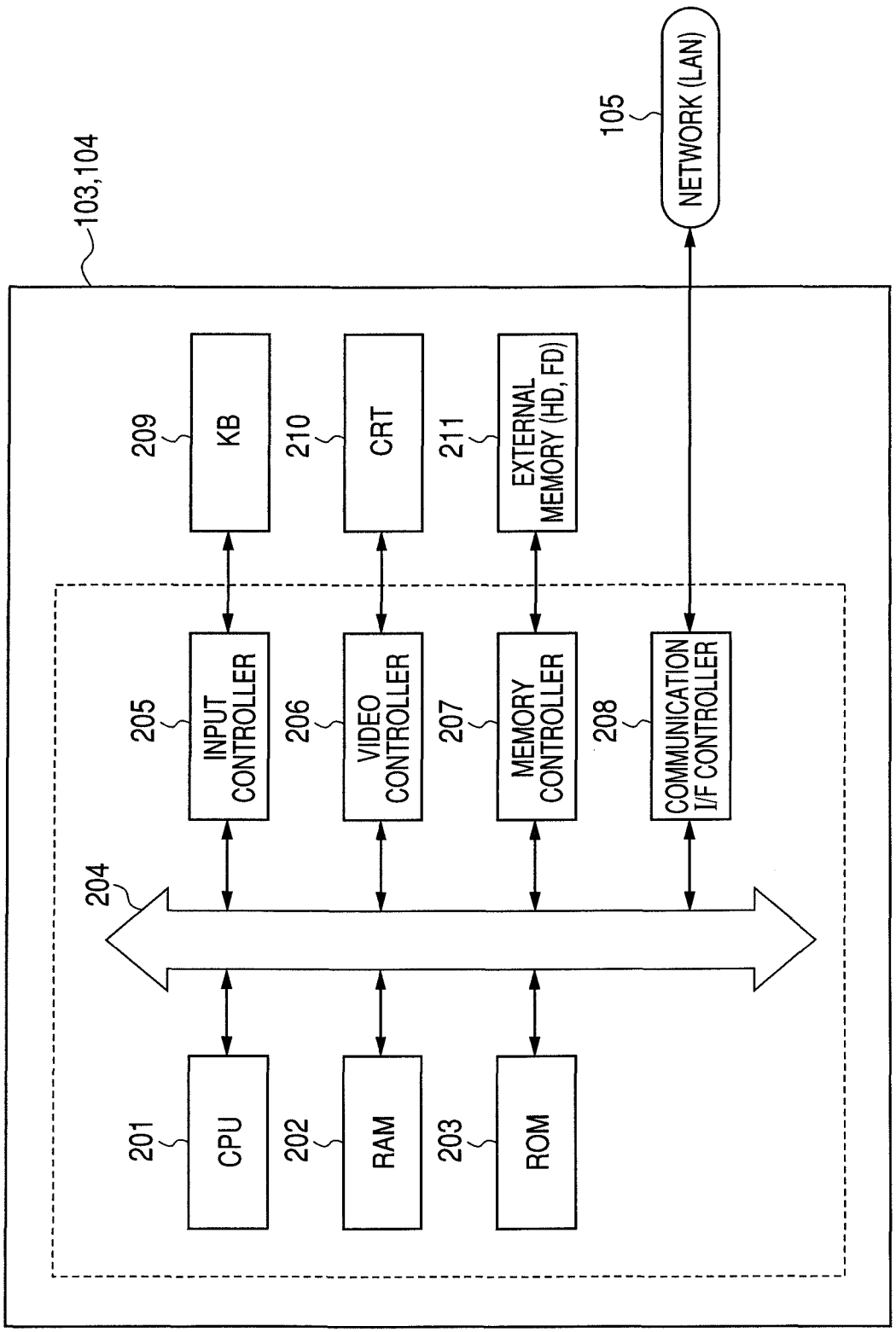
FIG. 2 is a block diagram exemplifying hardware structure of a client PC and a directory server illustrated in FIG. 1.

FIG. 2 is a block diagram illustrating a hardware framework of the client PC 103 and the directory server 104 illustrated in FIG. 1.

As illustrated in FIG. 2, the client PC 103 and the directory server 104 respectively include hardware frameworks of CPUs 201, RAMs 202, ROMs 203, system buses 204, input controllers 205, video controllers 206, memory controllers 207, communication interface (communication I/F) controllers 208, keyboards (KBs) 209, CRT displays (CRTs) 210 and external memories 211.

The CPU 201 is a processor for collectively controlling the respective devices and controllers connected to the system buses 204. One of the ROM 203 and the external memory 211 stores BIOS (Basic Input/Output System) being a control program of the CPU 201, an operating system program (hereinafter to be referred to as OS), various kinds of programs required for realizing function executed by one of the respective client PCs 103 and the respective directory servers 104. Moreover, one of the ROM 203 and the external memory 211 stores a definition file and various kinds of information tables used for executing information programs.

The RAM 202 functions, for example, as main memory and work area of the CPU 201. At execution of the process, the CPU 201 loads required programs from one of the ROM 203 and the external memory 211 to the RAM 202 to execute the relevant loaded program and, thereby, realizes the respective kinds of operations.

The input controller 205 controls the input from the keyboard (KB) 209 and a pointing device such as a mouse not illustrated in the drawing.

The video controller 206 controls display to the CRT display (CRT) 210 being a display apparatus. Here, FIG. 2 illustrates an example where a CRT display (CRT) is applied as the display apparatus. However, the display apparatus can be a mode where not only the CRT display (CRT) but also a liquid crystal display, for example, is applied. The manager uses those displays according to necessity.

The memory controller 207 controls accesses to a boot program, various kinds of applications, font data, a user file, an edit file, a hard disk (HD) for storing, for example, various kinds of data, a flexible disk (FD) and otherwise the external memory 211 such as a compact flash (registered trademark) memory connected to a PCMCIA card slot through an adaptor.

The communication I/F controller 208 is connected to an external apparatus via the network 105 for communication to execute communication control processing for the network 105. For example, the communication I/F controller 208 can communicate with TCP/IP. The region surrounded by dashed lines in FIG. 2 is a region included, for example, as a controller unit.

The CPU 201 executes, for example, outline font expanding (rasterizing) process to the region for display information inside the RAM 202 and, thereby, enables display on the CRT display (CRT) 210. The CPU 201 can accept instruction from a user through a mouse cursor not illustrated in the drawing displayed on the CRT display (CRT) 210.

Next, a hardware framework applicable to the MFP 101 illustrated in FIG. 1 will be described.

Figure 3:
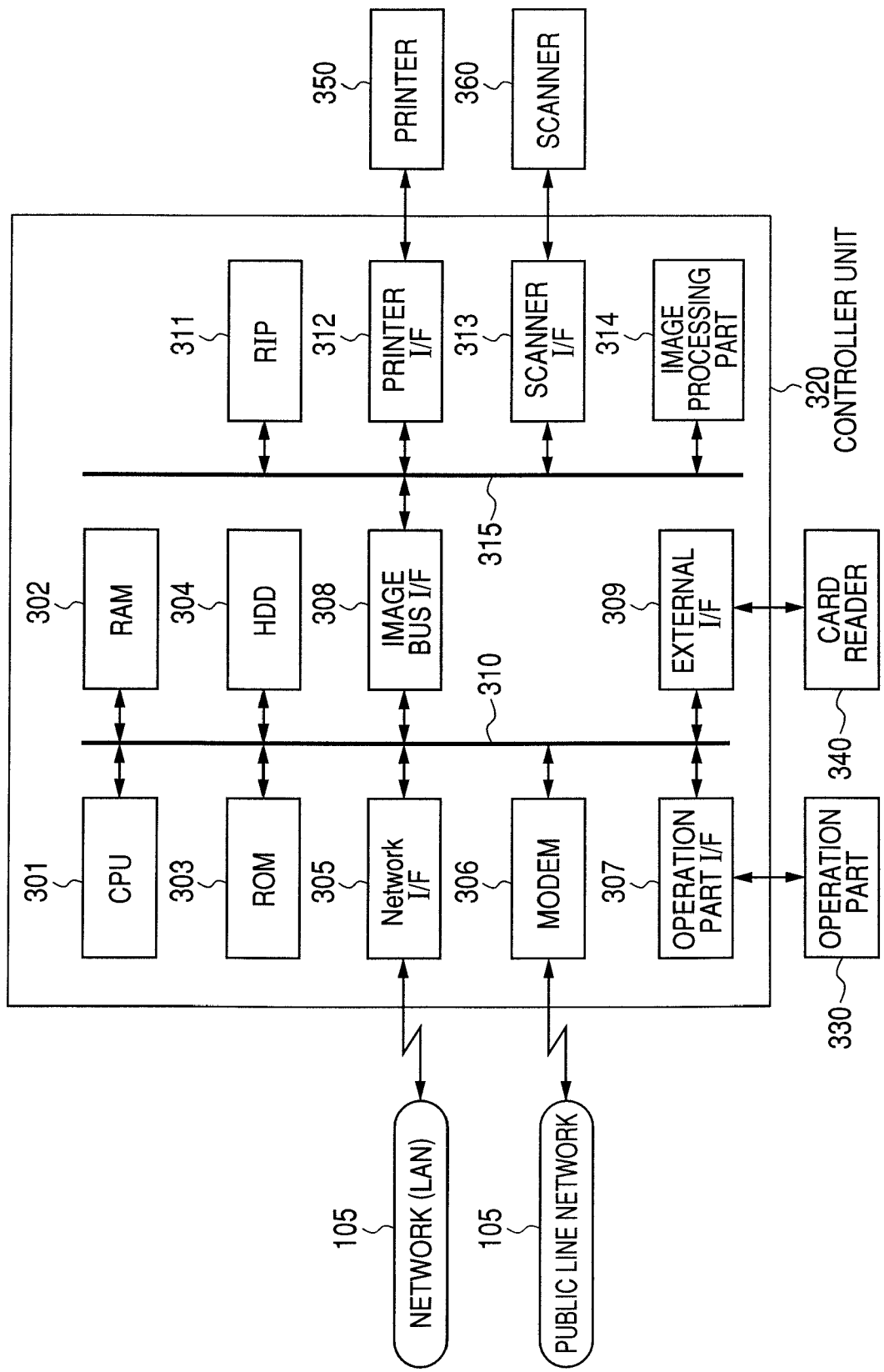
FIG. 3 is a block diagram exemplifying a hardware framework of an MFP illustrated in FIG. 1.

FIG. 3 is a block diagram exemplifying a hardware framework of the MFP 101 illustrated in FIG. 1.

As illustrated in FIG. 3, the MFP 101 includes respective hardware frameworks of a controller unit 320, an operation part 330, a card reader 340, a printer 350 and a scanner 360.

The controller unit 320 includes respective hardware frameworks of a CPU 301, an RAM 302, an ROM 303, a hard disk drive (HDD) 304, a network interface (Network_I/F) 305, a modem (MODEM) 306, an operation part interface (operation part I/F) 307, an image bus interface (IMAGE_BUS_I/F) 308, an external interface (external I/F) 309, a system bus 310, a raster image processor (RIP) 311, a print interface (printer I/F) 312, a scanner interface (I/F) 313, an image processing part 314 and an image bus 315.

The controller unit 320 is connected to the scanner 360 functioning as an image input device and the printer 350 functioning as an image output device. On the other hand, the controller unit 320 is connected to the network 105 and a public line network (WAN) of, for example, one of PSTN and ISDN and, thereby, inputs and outputs image data and device information.

The CPU 301 is a processor for collectively controlling the respective devices connected to the system bus 310 and the image bus 315.

The RAM 302 is work memory for operating the CPU 301 and also functions as program memory for storing programs and as image memory for temporarily storing image data.

The ROM 303 stores the system boot program and a various kinds of control programs. The HDD 304 stores various kinds of programs and image data for controlling the system.

The Network_I/F 305 is connected to the network (LAN) 105 to input and output data. The MODEM 306 is connected to the public line network to input and output data such as transmission and reception in a facsimile.

The operation part I/F 307 is an interface in the operation part 330 being a user interface (UI) and outputs to the operation part 330 image data to be displayed in the operation part 330. When a user of the present system inputs information (for example, user information) from the operation part 330, the operation part I/F 307 transmits the information to the CPU 301. Here, the operation part 330 comprises a display part including a touch panel corresponding to a keyboard. The user pushes (for example, touches with a finger) the button of the keyboard displayed on the relevant display part down and, thereby, the operation part 330 can give various instructions.

The IMAGE_BUS_I/F 308 is a bus bridge for connecting the system bus 310 to the image bus 315 transporting image data rapidly and converting data structure.

The external I/F 309 is an interface accepting external inputs from USB, IEEE1394, printer port, RS-232C and the like. In the present embodiment, the card reader 340 for reading information of the IC card required for IC card authentication is connected to the external I/F 309. The CPU 301 controls reading information from the IC card read by the card reader 340 through that external I/F 309 and can obtain information read by the relevant IC card.

The above described devices 301 to 309 are arranged on the system bus 310 and are mutually communicable.

The RIP 311 expands vector data such as a PDL code to a bit map image.

The printer I/F 312 connects the printer 350 to the controller unit 320 to carry out conversion of a synchronous/asynchronous system of image data.

The scanner I/F 313 connects the scanner 360 to the controller unit 320 to carry out conversion of a synchronous/asynchronous system of image data.

The image processing part 314 executes correction, processing and edition on input image data and executes a correction process and a resolution conversion process of the printer on print output image data. The image processing part 314 executes, in addition to those processes, rotation of image data, and a compressing and expanding process such as JPEG for multivalued image data, and JBIG, MMR and MH for binary image data.

The above described devices 308 and 311 to 314 are arranged on the image bus 315 and are mutually communicable. The image bus 315 includes, for example, one of a PCI bus and an IEEE 1394.

The operation part 330 specifically includes an LCD display part. A touch panel sheet is pasted on the relevant LCD display part to display an operation screen of the present system. When a key (button) on the displayed operation screen is pushed, that positional information is transmitted to the CPU 301 through the operation part I/F 307. The operation part 330 comprises keyboard function as various kinds of operation keys such as a start key, a stop key, an ID key and a reset key.

Here, the start key of the operation part 330 operates, for example, at the occasion of starting operation to read a copy image. Two-color LEDs in green and red, for example, are at the center part of that start key. Light emission in those respective colors indicates whether or not the start key is ready for use. The stop key of the operation part 330 operates, for example, at the occasion of stopping the ongoing operation. The ID key of the operation part 330 operates, for example, at the occasion of inputting a user ID of a user. The reset key of the operation part 330 operates, for example, at the occasion of initializing the setting by the operation part 330.

The card reader 340 is controlled by the CPU 301 to read user identification information stored inside an IC card (for example, FeliCa (registered trademark) of Sony corporation) corresponding to an authentication card. The user identification information read by the card reader 340 is notified to the CPU 301 though the external I/F 309.

The printer 350 converts, for example, raster image data as an image on paper. Its conversion method includes an electrophotographic system with a photosensitive drum and a photosensitive belt and an inkjet system discharging ink from a micro nozzle array to print an image directly onto paper. However, any conversion method can be used. The startup of the print operation of the printer 350 is started by instruction from the CPU 301. Here, the printer 350 includes a plurality of paper feeding stages so as that one of different sheet sizes and different sheet directions can be selected. Sheet paper cassettes corresponding to respective paper feeding stages are provided.

The scanner 360 illuminates an image on the copy sheet to scan the copy with a CCD line sensor and, thereby, converts the copy image to electric signals as raster image date. The copy sheet is set on a tray of a document feeder. The user of the MFP 101 gives read startup instructions from the operation part 330. Thereby the CPU 301 gives instructions to the scanner 360. The feeder feeds the copy sheet one by one to read the image of the copy.

The framework described above enables the MFP 101 to transmit image data read from the scanner 360 onto the network (LAN) 105 and the printer 350 to print and output the print data received from the network (LAN) 105. In addition, the MFP 101 can transmit the image data read from the scanner 360 onto a public line network from the MODEM 306 by facsimile and print and output the image data received by facsimile from the public line network.

Figure 4:
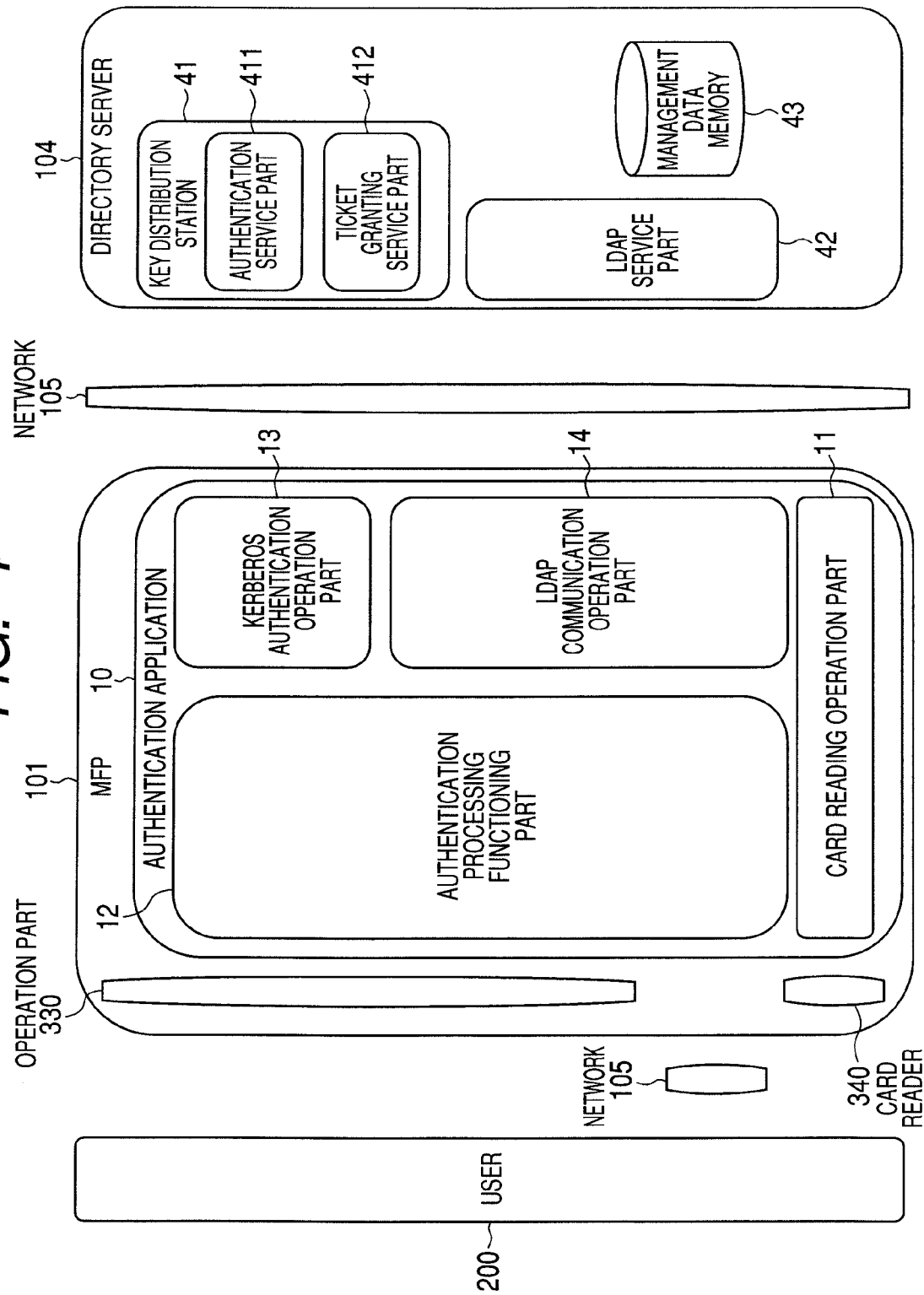
FIG. 4 is a schematic diagram exemplifying a skeleton framework of the authentication system according to the first embodiment of the present invention.

FIG. 4 is a schematic diagram exemplifying a skeleton framework of the authentication system according to the first embodiment of the present invention. Specifically, FIG. 4 illustrates respective function frameworks in the MFP 101 and the directory server 104 of the authentication system 100.

As FIG. 4 illustrates, the MFP 101 includes authentication application 10 including respective function frameworks of a card reading operation part 11, an authentication processing functioning part 12, a Kerberos authentication operation part 13 and an LDAP communication operation part 14 in addition to the hardware framework of an operation part 330 inclusive of a keyboard and a card reader 340 for reading user identification information of an IC card. The respective function framework in the authentication application 10 includes, for example, a program stored in one of the CPU 301 illustrated in FIG. 3, the ROM 303 and the HDD 304 and the memory of one of the HDD 304 and the RAM 302.

The directory server 104 includes an application of a key (ticket) distribution station 41 executing an authentication service part 411 and a ticket granting service part 412, an application of an LDAP service part 42 and a management data memory 43. The applications of the key distribution station 41 and the LDAP service part 42 include programs stored, for example, in the CPU 201 and one of the ROM 203 and the external memory 211 illustrated in FIG. 2. The management data memory 43 is included, for example, in the external memory 211 illustrated in FIG. 2.

Figure 5:
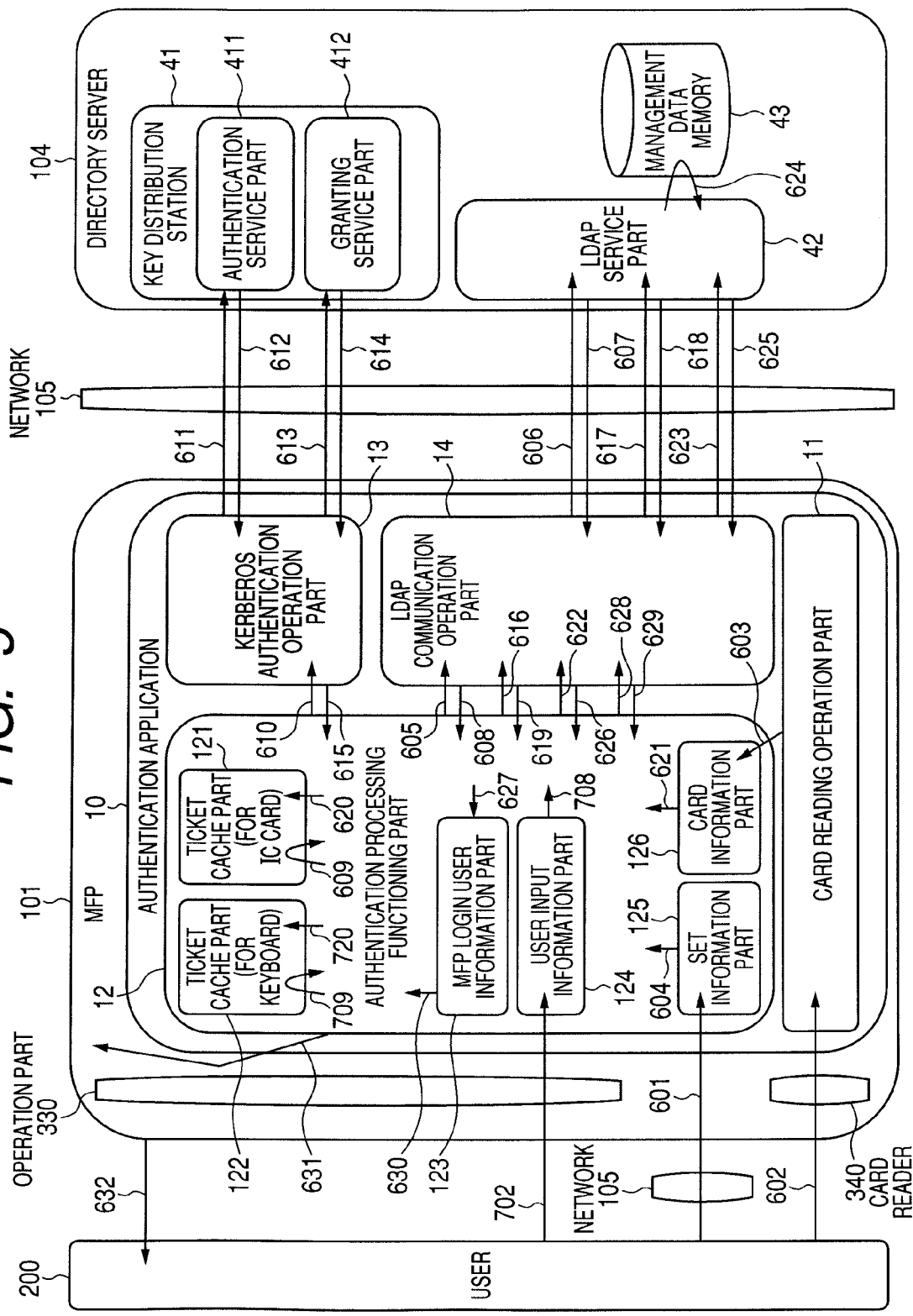
FIG. 5 is a schematic diagram exemplifying processing of each function framework of the authentication system according to the first embodiment of the present invention.

FIG. 5 is a schematic diagram exemplifying processing of each function framework of the authentication system according to the first embodiment of the present invention. Like reference numerals designate the same or similar frameworks in FIG. 4 and FIG. 5.

As FIG. 5 illustrates, the authentication processing functioning part 12 is provided with an IC card ticket cache part 121, a keyboard ticket cache part 122, an MFP login user information part 123, a user input information part 124, a set information part 125 and a card information part 126. One of the HDD 304 and the RAM 302 of the MFP 101 illustrated in FIG. 3, for example, includes those frameworks 121 to 126.

The IC card ticket cache part 121 being a storage region stores a service ticket for IC card authentication at the occasion when an IC card is held over a card reader 340.

The keyboard ticket cache part 122 being a storage region stores a service ticket for keyboard authentication at the occasion when user information is input from a keyboard of the operation part 330.

The MFP login user information part 123 being a storage region stores user information searched by the LDAP service part 42.

The user input information part 124 being a storage region stores user input information being input to the MFP 101 with a keyboard of the operation part 330.

The set information part 125 being a storage region stores set information (various kinds of information of, for example, domain, host, user name and password) that a user (a manager here) sets in the MFP 101 with a client PC 103 through a network.

The card information part 126 being a storage region stores card information read by the card reader 340.

Next, the respective function framework in the authentication application 10 of the MFP 101 will be described.

<Description on Card Reading Operation Part 11>

The user holds an IC card over the card reader 340. Then the card reading operation part 11 controls the card reader 340 to obtain card information from the card (602) and delivers the obtained card information to the authentication processing functioning part 12 (603).

FIG. 6 is a schematic diagram exemplifying card information obtained by a card reading operation part 11 of the MFP 101. FIG. 6 illustrates information of a card ID as card information.

<Description on Authentication Processing Functioning Part 12>

The authentication processing functioning part 12 obtains set information that a manager inputs with the client PC 103 through the network 105 to store and set the obtained set information in the set information part 125 (601).

FIG. 7 is a schematic diagram exemplifying setting information being set by a set information part 125 of the MFP 101. As FIG. 7 illustrates, respective kinds of information of domain, host, user name and password are set as setting information. The information of the domain and host is information for identifying respective directory servers in a plurality of directory servers 104 connected to the network 105. The information of the user name and the password is information used for authentication (that is, authentication of the preceding stage of the authentication for allowing the user 200 to use the MFP 101) to obtain a service ticket. Here, in a mode, a plurality of hosts (directory servers 104) can be registered for one domain in the set information. There can be also a mode of registering a plurality of domains. In particular, the set information illustrated in FIG. 7 is utilized as information for logging in to the directory server 104 at the occasion of IC card authentication. For the present embodiment, the set information illustrated in FIG. 7 will be made ready for each directory server 104 connected to the network 105.

Here, information for logging in to the directory server 104 at the occasion of IC card authentication will be retained for each domain to which the directory server 104 belongs but can be configured to retain by each directory server 104.

The set information stored in that set information part 125 is used at the occasion of LDAP communication. The authentication processing functioning part 12 reads the set information from the set information part 125 (604) and delivers the read set information to the LDAP communication operation part 14 to request for connection (605).

Moreover, when the card reading operation part 11 obtains card information, the authentication processing functioning part 12 obtains the relevant card information from the card reading operation part 11 to store the information in the card information part 126 (603). Thereafter, at the occasion of IC card authentication, the authentication processing functioning part 12 reads the card information stored in the card information part 126 (621).

When the user inputs the user input information with, for example, a keyboard of the operation part 330, the authentication processing functioning part 12 stores the relevant user input information in the user input information part 124 (702).

FIG. 8 is a schematic diagram exemplifying user input information stored in a user input information part 124 of the MFP 101. As FIG. 8 illustrates, the respective kinds of information of domain, user name and password are set as user input information.

The user input information stored in this user input information part 124 is utilized at the occasion of Kerberos authentication. The authentication processing functioning part 12 reads the user input information from the user input information part 124 (708) and delivers the read user input information to the Kerberos authentication operation part 13 to request for obtaining a service ticket (610).

The authentication processing functioning part 12 obtains card information illustrated in FIG. 6 from the card reading operation part 11 and, then, obtains the domain, the user name and the password from the set information illustrated in FIG. 7 to obtain the service ticket of the relevant user illustrated in FIG. 9 from the IC card ticket cache part 121 (609). Here, the service ticket includes encrypted data having undergone encryption as FIG. 9 illustrates. The set information part 125 will retain set information illustrated in FIG. 7 only for the number of the domains and hosts (that is, for the number of the directory servers connected to the network 105).

The authentication processing functioning part 12 obtains user input information illustrated in FIG. 8 from the user input information part 124 and, then, obtains the domain, the user name and the password from the set information illustrated in FIG. 7 to obtain the service ticket of the relevant user illustrated in FIG. 9 from the keyboard ticket cache part 121 (709).

In the case where no service ticket is cached in one of the IC card ticket cache part 121 and the keyboard ticket cache part 122 in one of the above described processing 609 and processing 709, the authentication processing functioning part 12 obtains the domain, the user name and the password from the set information illustrated in FIG. 7 and delivers the obtained information to the Kerberos authentication operation part 13 to request for obtaining a service ticket (610).

The authentication processing functioning part 12 delivers the obtained service ticket to the LDAP communication operation part 14 to request for authentication (616) and delivers the card information illustrated in FIG. 6 to request for a search (622) and request for ending connection (628).

The authentication processing functioning part 12 stores the service ticket successfully authenticated in the above described processing 616 in one of the IC card ticket cache part 121 and the keyboard ticket cache part 122 (620 and 720). At that occasion, the service ticket is cached in the IC card ticket cache part 121 for each set information illustrated in FIG. 7 (that is, for each directory server 104 being connected to the network 105 (for each domain in the present embodiment)). The service ticket is cached for each user based on the user input information being input from the operation part 330 in the keyboard ticket cache part 122.

FIG. 10 is a schematic diagram exemplifying user management data stored in a management data memory 43 of the directory server 104. As FIG. 10 illustrates, respective kinds of information of user name, display name, mail, group and extended attribute (for example, card information) are set as management data of a user. In addition, the management data memory 43 stores management data of one of a user and a plurality of users. The password (not illustrated in the drawing) for each user is also managed as management data. This password is used at the occasion of authentication processing in the step S216 in FIG. 13B-2 to be described later and authentication processing in the step S310 in FIG. 16B-1. The relevant password is encrypted so as to allow the LDAP service part 42 to make a reference. This password is managed so as to allow only the LDAP service part 42 to know. The management data (user management information) in FIG. 10 stores at least the user name (user identification information) and extended attribute (user identifying information) for one user.

FIG. 11 is a schematic diagram exemplifying MFP login user information stored in an MFP login user information part 123 of the MFP 101. As FIG. 11 illustrates, the respective kinds of information of user name, display name, domain, mail and authorization are set as MFP login user information.

The authentication processing functioning part 12 sets the user name, the display name and the mail among the respective kinds of management data illustrated in FIG. 10 and searched by the above described processing 622 as the user name, the display name and the mail of the MFP login user information illustrated in FIG. 11. The authentication processing functioning part 12 sets manager authorization (for example, Administrator) for the authorization in the MFP login user information illustrated in FIG. 11 in the case where the group of the management data illustrated in FIG. 10 is a particular group (for example, Canon_Peripheral_Admins). The authentication processing functioning part 12 sets the domain in the connected directory server 104 to the domain in the MFP login user information illustrated in FIG. 11. The authentication processing functioning part 12 stores the set MFP login user information illustrated in FIG. 11 in the MFP login user information part 123 (627).

The authentication processing functioning part 12 reads the MFP login user information stored in the MFP login user information part 123 (630) and delivers, for example, to the CPU 301 of the MFP 101 to request for login processing and request for screen transition processing by the operation part 330 (631). Thereby, the operation part 330 displays the login result to notify the user 200 of the relevant login result (632).

<Description on Kerberos (Ticket) Authentication Operation Part 13>

The Kerberos authentication operation part 13 receives the domain, the user name and the password from the authentication processing functioning part 12 (610). The Kerberos authentication operation part 13 produces a request for authentication based on the user name and the password and issues the relevant authentication request to the authentication service part 411 managed by the key distribution station 41 of the directory server 104 in the designated domain through the network 105 (611). The Kerberos authentication operation part 13 receives authentication reply produced by the authentication service part 411 (612).

Here, the authentication request (AS-REQ) refers to a request to the authentication service part 411 in Kerberos authentication. In addition, the authentication reply (AS-REP) refers to a reply from the authentication service part 411 in Kerberos authentication.

The Kerberos authentication operation part 13 produces a ticket granting request based on the authentication reply from the authentication service part 411 and issues the request to the ticket granting service part 412 of the directory server 104 (613). The Kerberos authentication operation part 13 receives ticket granting reply produced by the ticket granting service part 412 (614).

The ticket granting request (TGT-REQ) refers to a request to the ticket granting service part 412 in Kerberos authentication. The ticket granting reply (TGT-REP) refers to a reply from the ticket granting service part 412 in Kerberos authentication.

The Kerberos authentication operation part 13 takes out the service ticket illustrated in FIG. 9 from the ticket granting reply sent from the ticket granting service part 412 to deliver the taken-out service ticket to the authentication processing functioning part 12 (615).

<Description on LDAP Communication Operation Part 14>

The LDAP communication operation part 14 carries out connection processing to the LDAP service part 42 of the designated directory server 104 through the network 105 based on the domain and the host among the respective kinds of information of set information set in the set information part 125 and illustrated in FIG. 7 (606). The LDAP communication operation part 14 receives connectability from the LDAP service part 42 (607) to reply to the authentication processing functioning part 12 (608).

The LDAP communication operation part 14 transmits the service ticket (616) received from the authentication processing functioning part 12 and illustrated in FIG. 9 to the LDAP service part 42 through the network 105 (617). The LDAP communication operation part 14 receives the result of determination on availability of service ticket authentication carried out by the LDAP service part 42 (618) and replies this result to the authentication processing functioning part 12 (619).

In the case of IC card authentication, the LDAP communication operation part 14 obtains the card information illustrated in FIG. 6 from the authentication processing functioning part 12 (622) and transmits the obtained card information to the LDAP service part 42 through the network 105 (623). In the case of keyboard authentication, the LDAP communication operation part 14 obtains the user name from the user input information illustrated in FIG. 8 (622) and transmits information on the obtained user name to the LDAP service part 42 through the network 105 (623).

When the LDAP service part 42 searches for management data stored in the management data memory 43 (624), the LDAP communication operation part 14 receives the searched management data from the LDAP service part 42 (625) and replies to the authentication processing functioning part 12 with the relevant management data (626).

The LDAP communication operation part 14 receives a communication disconnection request from the authentication processing functioning part 12 (628) to carry out processing to disconnect communication to the LDAP service part 42. The LDAP communication operation part 14 replies to the authentication processing functioning part 12 with a result of that disconnection process (629).

Next, set process procedure of the set information carried out in the preceding stage for IC card authentication and keyboard authentication will be described.

FIG. 12 is a flow chart exemplifying set process procedure in set information of an authentication system according to the first embodiment of the present invention. In the flow chart illustrated in FIG. 12, the user (manager in FIG. 12) 200 illustrated in the upper part of FIG. 12, the respective function frameworks (11 to 14) in the authentication application 10 and the processing in the directory server 104 are illustrated in a vertically divided manner.

When set processing on set information starts and a user (manager, here) 200 inputs set information including the respective kinds of information of domain, host, user name and password illustrated in FIG. 7, the authentication processing functioning part 12 searches for this set information in the step S101.

Subsequently, in the step S102, the authentication processing functioning part 12 stores the set information searched in the step S101 in the set information part 125.

The set processing of the set information is carried out for the set information part 125 as described above. The set information set in the set information part 125 is set for the number of the domains and hosts (that is, for the number of the directory servers connected to the network 105). This set information is utilized at the occasion of connection to the directory server 104.

Next, the process procedure of IC card authentication will be described.

Figure 13A:
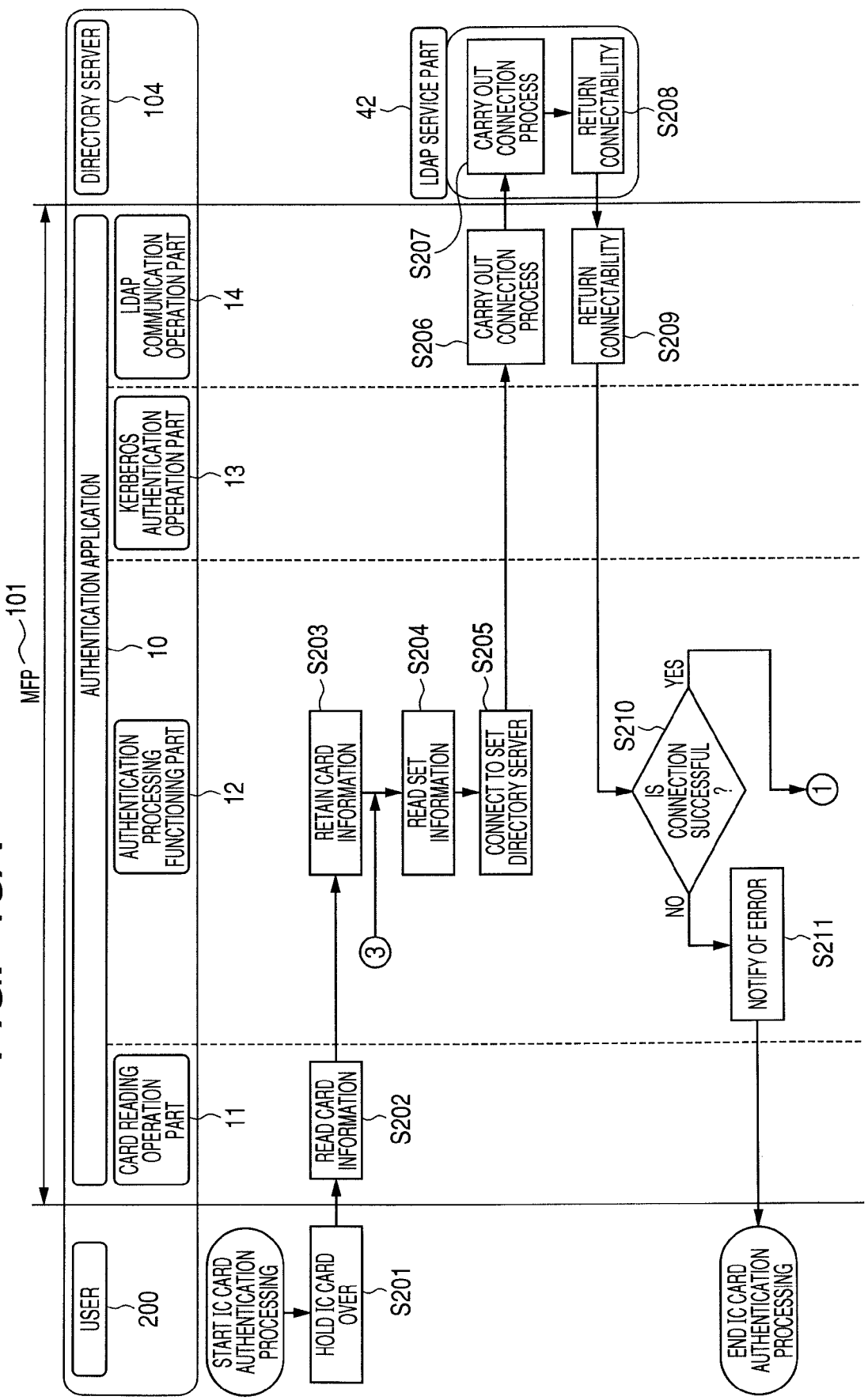
FIG. 13A is a flow chart exemplifying process procedure in IC card authentication of the authentication system according to the first embodiment of the present invention.
Figures 2, 13B:
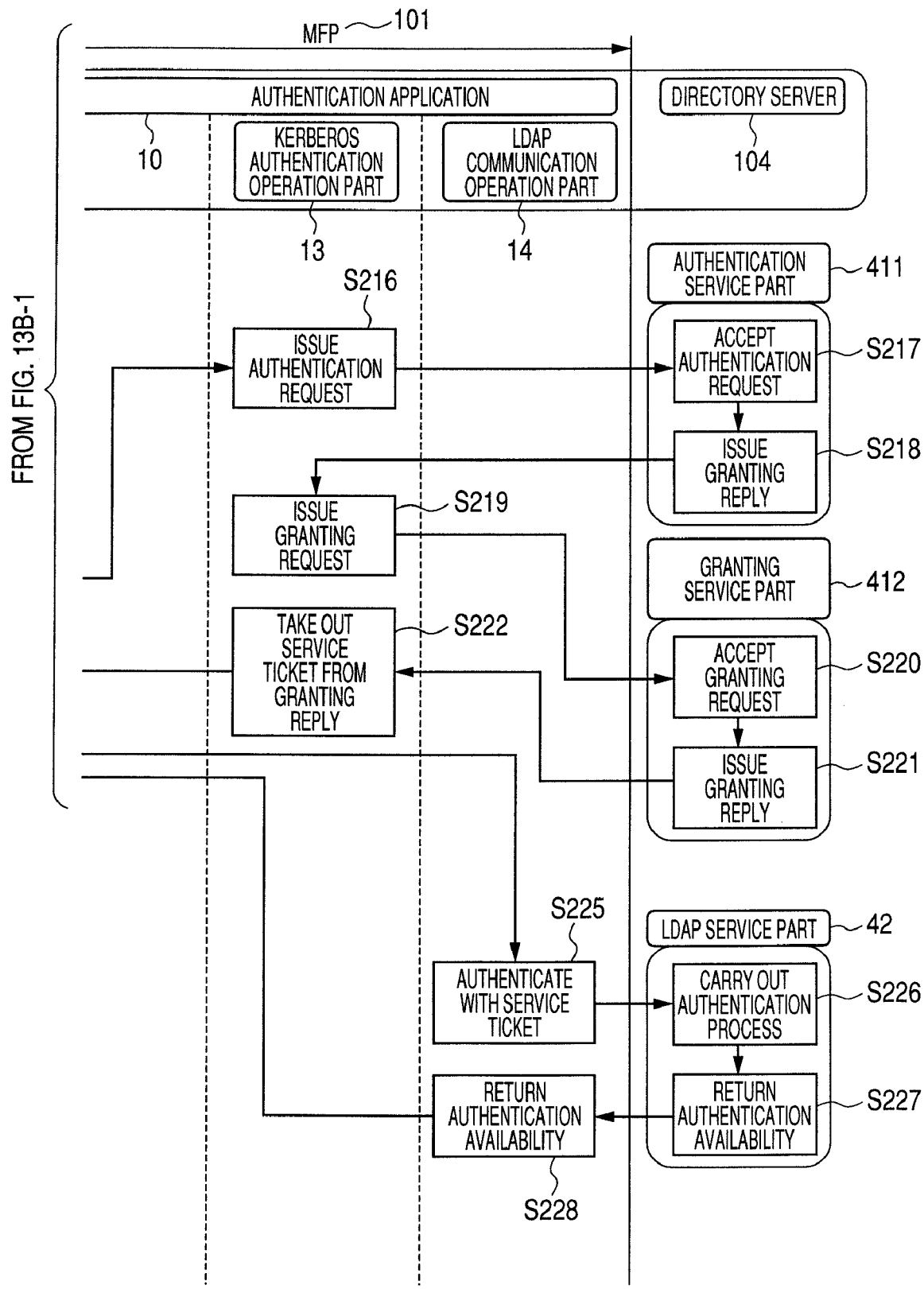
FIG. 13B comprising
Figure 13C:
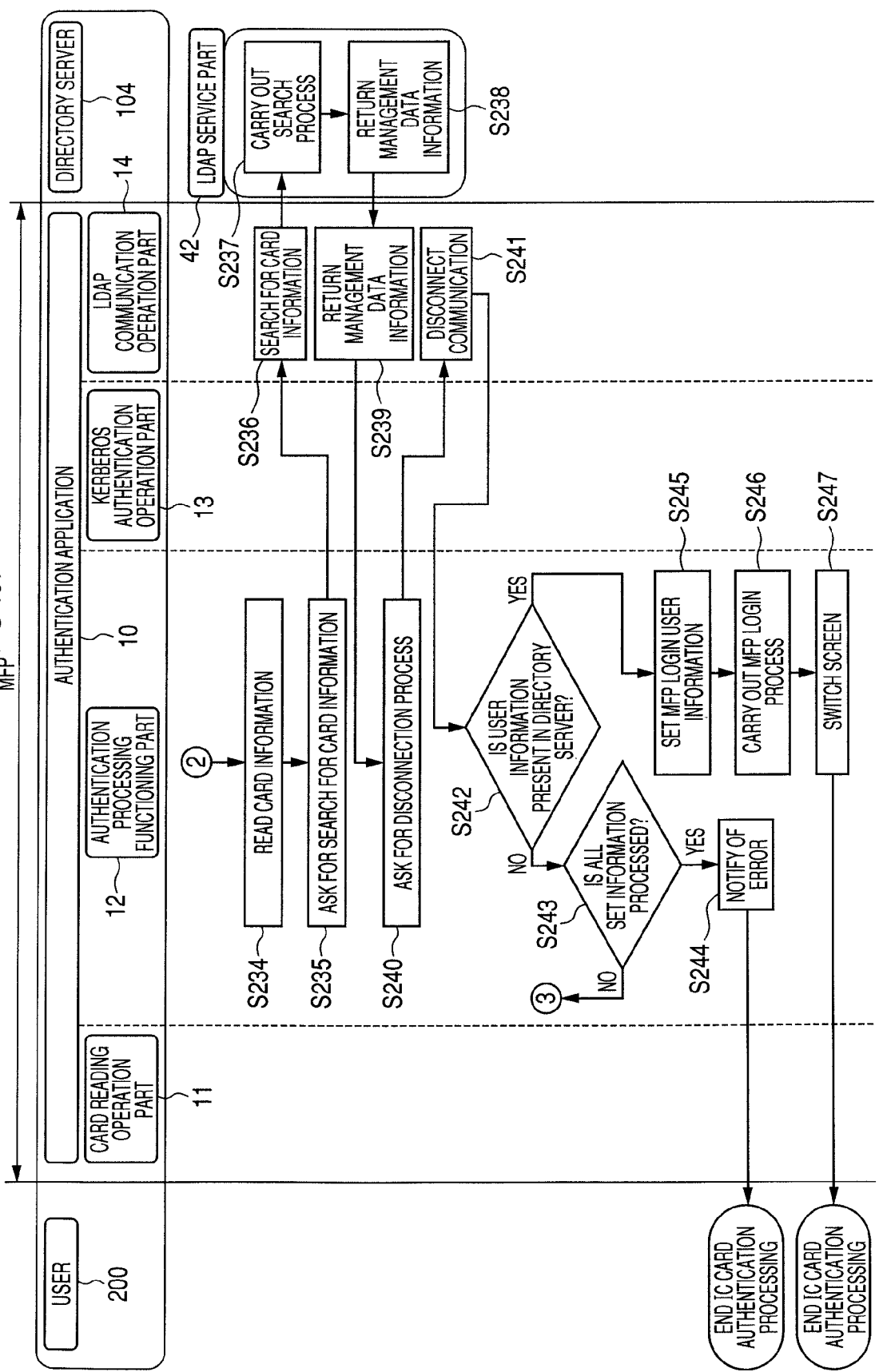
FIG. 13C is a flow chart exemplifying the process procedure in the IC card authentication of the authentication system according to the first embodiment of the present invention in succession to FIGS. 13B-1 and 13B-2.

FIG. 13A to FIG. 13C are flow charts exemplifying process procedure in IC card authentication of the authentication system according to the first embodiment of the present invention. In the flow charts illustrated in FIG. 13A to FIG. 13C, the user 200 illustrated in the upper part of each drawing, the respective function frameworks (11 to 14) in the authentication application 10 and the processing in the directory server 104 are illustrated in a vertically divided manner.

When the processing in IC card authentication starts and the user 200 holds his/her own IC card over the card reader 340, the card reading operation part 11 searches this card through the card reader 340 in the step S201 in FIG. 13A.

Subsequently, in the step S202, the card reading operation part 21 reads card information (for example, information illustrated in FIG. 6) of the user 200 obtained by the card reader 340.

Subsequently, in the step S203, the authentication processing functioning part 12 stores and retains the card information read in the step S202 in the card information part 126.

Subsequently, the authentication processing functioning part 12 reads one piece of set information among a plurality of pieces of set information retained in the set information part 125 in the step S102 in FIG. 12.

Subsequently, in the step S205, the authentication processing functioning part 12 delivers the information on the domain and the host of the set information read in the step S204 and illustrated in FIG. 7 to the LDAP communication operation part 14 and asks for processing of connection to the corresponding directory server 104.

Subsequently, in the step S206, the LDAP communication operation part 14 carries out the connection process to the directory server 104 corresponding to the host of the domain of the set information delivered in the step S205. Here, in the case where connection to the host of a certain domain is unsuccessful, a process for connecting to another host of the same domain is feasible.

Subsequently, in the step S207, the process of the LDAP service part 42 of the directory server 104 establishes connection to the LDAP communication operation part 14.

Subsequently, in the step S208, the LDAP service part 42 replies to the LDAP communication operation part 14 with connectability.

Subsequently, in the step S209, the LDAP communication operation part 14 replies to the authentication processing functioning part 12 with the connectability transmitted from the LDAP service part 42.

Subsequently, in the step S210, the authentication processing functioning part 12 determines whether or not the process for connecting to the directory server 104 is successful based on the information of the connectability received from the LDAP communication operation part 14.

The step S211 follows the step S210 in the case where the process for connecting to the directory server 104 is unsuccessful (that is, failure) as a result of the determination in the step S210. In the step S211, the authentication processing functioning part 12 carries out an error notifying process on, for example, the screen being presently displayed by the operation part 330. Thereby, an error screen 1540 in FIG. 15 to be described later is displayed, for example, by the operation part 330. Thereafter, the IC card authentication process is finalized.

On the other hand, the step S212 in FIG. 13B-1 follows the step S210 in the case where the process for connecting to the directory server 104 is successful as a result of the determination. In the step S212, the authentication processing functioning part 12 reads the set information (FIG. 7) read in the step S204 again.

Subsequently, in the step S213, the authentication processing functioning part 12 obtains the domain, the user name and the password from the set information read in the step S212 to carry out search processing on whether the service ticket based on the obtained information is cached in the IC card ticket cache part 121.

FIG. 14 is a schematic diagram exemplifying data structure of service ticket cache in one of an IC card ticket cache part 121 and a keyboard ticket cache part 122. This service ticket cache is used to store the service ticket illustrated in FIG. 9. In order to specify which service ticket should be used, this data structure retains key information obtained by hashing one of the set information in FIG. 7 and the domain of the user input information, the user name and the password in FIG. 8 by hash function. Encrypted data of the service ticket includes the domain, the user name and the password. This information will enable the LDAP service part 42 to determine whether or not authentication is allowed.

The search process in the step S213 hashes the domain, the user name and the password with hash function and obtains a value as a key to carry out processing for searching the IC card ticket cache part 121 for presence of a service ticket corresponding to the relevant key.

Subsequently, in the step S214, the authentication processing functioning part 12 determines presence of a service ticket based on the set information obtained by the IC card ticket cache part 121 in the search process in the step S213.

The step S215 follows the step S214 in the case where no service ticket based on the obtained set information in the IC card ticket cache part 121 is present as a result of the determination in the step S214. In the step S215, the authentication processing functioning part 12 delivers the set information read in the step S212 to the Kerberos authentication operation part 13 to make a request for issuance of the service ticket. The user name and the password of the set information read in the step S204 is used for this issuance request. This set information is common information used at the occasion of authentication processing with the IC card and includes at least the user name (user identification information) and the password. As for the information of the domain and the host, the user name and the password do not have to be stored in pair but can be configured to be stored in one of a program and an information file to which the program makes reference appropriately, for example, in the case where the domain and the host are uniquely determined.

Subsequently, in the step S216, the Kerberos authentication operation part 13 receives the set information (specifically, the domain, the user name and the password of the set information) from the authentication processing functioning part 12 to produce an authentication request based on the domain, the user name and the password of the relevant set information. The Kerberos authentication operation part 13 issues the produced authentication request to the authentication service part 411 managed by the key distribution station 41 of the directory server 104 of the designated domain through the network 105. Specifically, in the step S216, if the management data (user management information) illustrated in FIG. 10 includes corresponding user name and password, the corresponding directory server 104 is determined to allow authentication. Thereafter, in the step S218, the corresponding directory server 104 replies with availability of authentication. On the other hand, in the case where the password is wrong, the directory server 104 is determined not to allow authentication and thereafter replies with unavailability of authentication in the step S218.

Subsequently, in the step S217, the authentication service part 411 accepts the authentication request transmitted from the Kerberos authentication operation part 13. This authentication request processing with the user name and the password transmitted from the step S216, searches whether the user name corresponding to the transmitted user name is present in the management data (user management information) in FIG. 10 and determines whether the password corresponding to the user corresponds with the transmitted password in the case where the corresponding user name is inside the management data (user management information).

Subsequently, in the step S218, the authentication service part 411 produces an authentication reply based on the authentication request received in the step S217 and issues the reply to the Kerberos authentication operation part 13.

Subsequently, in the step S219, the Kerberos authentication operation part 13 receives an authentication reply from the authentication service part 411 and issues a ticket granting request to the ticket granting service part 412.

Subsequently, in the step S220, the ticket granting service part 412 accepts the ticket granting request transmitted from the Kerberos authentication operation part 13 in the step S219.

Subsequently, in the step S221, the ticket granting service part 412 produces a ticket granting reply based on the ticket granting request accepted in the step S220 and issues the reply to the Kerberos authentication operation part 13.

Subsequently, in the step S222, the Kerberos authentication operation part 13 takes out a service ticket from the ticket granting reply received from the ticket granting service part 412 and delivers the service ticket to the authentication processing functioning part 12.

On the other hand, the step S223 follows the step S214 in the case where a service ticket based on the obtained set information is present in the IC card ticket cache part 121 as a result of the determination in the step S214. In the step S223, the authentication processing functioning part 12 takes out the corresponding service ticket from the IC card ticket cache part 121.

The step S224 follows the step S222 and the step S223 in one of the case where the process in the step S222 is finalized and the case where the process in the step S223 is finalized. In the step S224, the authentication processing functioning part 12 delivers the service ticket obtained in one of the step S222 and the step S223 to the LDAP communication operation part 14 to make an authentication request.

Subsequently, in the step S225, the LDAP communication operation part 14 delivers the service ticket delivered from the authentication processing functioning part 12 to the LDAP service part 42 to make an authentication request.

Subsequently, in the step S226, the LDAP service part 42 carries out authentication processing on the service ticket received from the LDAP communication operation part 14 in the step S225.

Subsequently, in the step S227, the LDAP service part 42 replies the LDAP communication operation part 14 with authentication availability in the authentication processing carried out in the step S226.

Subsequently, in the step S228, the LDAP communication operation part 14 delivers the authentication availability received from the LDAP service part 42 to the authentication processing functioning part 12.

Subsequently, in the step S229, the authentication processing functioning part 12 determines, based on the information on the authentication availability received from the LDAP communication operation part 14, whether or not the authentication is successful.

The step S230 follows the step S229 in the case where the authentication is unsuccessful (that is, failure) as a result of the determination in the step S229. In the step S230, the authentication processing functioning part 12 searches the service ticket cache (that is, the IC card ticket cache part 121 for the present embodiment) illustrated in FIG. 14 for the service ticket with the corresponding key to delete the relevant service ticket.

Subsequently, in the step S231, the authentication processing functioning part 12 determines whether or not the authentication that is asked for in the step S224 is obtained by the service ticket cached in the IC card ticket cache part 121 in advance.

The step S215 is reinstated and is followed by the processing for newly obtaining a service ticket in the case where the authentication asked for in the step S224 is obtained by the service ticket cached in the IC card ticket cache part 121 in advance as a result of the determination in the step S231.

On the other hand, the step S232 follows the step S231 in the case where the authentication is not obtained by the service ticket cached in the IC card ticket cache part 121 in advance as a result of the determination. In the step S232, the authentication processing functioning part 12 carries out an error notifying process on, for example, the screen being presently displayed by the operation part 330. Thereby, an error screen 1540 in FIG. 15 to be described later is displayed, for example, by the operation part 330. Thereafter, the IC card authentication process is finalized.

On the other hand, the step S233 follows the step S229 in the case where the authentication is successful as a result of the determination in the step S229. In the step S233, the authentication processing functioning part 12 updates the service ticket cache (that is, the IC card ticket cache part 121 for the present embodiment) illustrated in FIG. 14.

Specifically, in the case where the service ticket cache illustrated in FIG. 14 includes the service ticket used for authentication, the relevant service ticket is moved to the top (number 1) of the service ticket cache illustrated in FIG. 14. In the case where no relevant service ticket is present in advance in the service ticket cache illustrated in FIG. 14, the top (number 1) of the service ticket cache illustrated in FIG. 14 is caused to store the relevant service ticket. At that time, in the case where the service ticket cache reaches the cache upper limit (10 units in the example illustrated in FIG. 14), the relevant service ticket is stored in the top (number 1) after the service ticket stored in the end (number 10) is deleted.

The step S234 illustrated in FIG. 13C follows the step S233 after completion of the process. In the step S234, the authentication processing functioning part 12 reads card information stored by the card information part 126 in the step S203.

Subsequently, in the step S235, the authentication processing functioning part 12 delivers the card information read in the step S234 to the LDAP communication operation part 14 to make a search request. Here, this search request grants use of the relevant MFP 101 to the IC card user 200.

Subsequently, in the step S236, the LDAP communication operation part 14 delivers the card information received from the authentication processing functioning part 12 in the step S235 to the LDAP service part 42 to make a search request.

Subsequently, in the step S237, the LDAP service part 42 searches for management data (for example, the user name) corresponding, in extended attribute, to the card information received from the LDAP communication operation part 14 in the step S236 and illustrated in FIG. 10 among the management data (user management information)) illustrated in FIG. 10 stored in the management data memory 43.

Subsequently, in the step S238, the LDAP service part 42 replies, through the network 105, to the LDAP communication operation part 14 with the management data searched in the step S237 as management data information. At that occasion, as a result of the search in the step S237, in the case where no relevant management data is present, information to the effect that no relevant management data is present is replied to the LDAP communication operation part 14.

Subsequently, in the step S239, the LDAP communication operation part 14 delivers the management data information transmitted from the LDAP service part 42 to authentication processing functioning part 12.

Subsequently, in the step S240, the authentication processing functioning part 12 makes a communication disconnection request to the LDAP communication operation part 14.

Subsequently, in the step S241, the LDAP communication operation part 14 disconnects connection to the LDAP service part 42.

Subsequently, in the step S242, the authentication processing functioning part 12 determines based on the management data information received from the LDAP communication operation part 14 in the step S239 (for example, presence of the user name) whether or not the directory server 104 includes the user information corresponding the user 200. At that occasion, in the case where the management data information is information (for example, the user name) of the management data searched in the step S237, the user information corresponding to the user 200 is determined to be present. In addition, in the case where the management data information is information to the effect that no corresponding management data is present, no user information corresponding to the user 200 is determined to be present.

The step S243 follows the step S242 in the case where no user information corresponding to the user 200 is present as a result of the determination in the step S242. In the step S243, the authentication processing functioning part 12 determines whether or not processing on all set information retained in the set information part 125 has been performed. That is, the process in the step S243 determines whether or not all directory servers 104 connected to the network 105 have undergone processing.

The step S204 is reinstated in the case where all set information retained in the set information part 125 has not undergone processing yet as a result of the determination in the step S243. Then, the not yet processed set information is read and the processes in the step S205 and forward are carried out.

On the other hand, the step S244 follows the step S243 in the case where all the set information retained in the set information part 125 has undergone processing as a result of the determination. In the step S244, the authentication processing functioning part 12 carries out an error notifying process on, for example, the screen being presently displayed by the operation part 330. Thereby, an error dialog 1540 in FIG. 15 to be described later is displayed, for example, by the operation part 330. Thereafter, the IC card authentication process is finalized.

On the other hand, the step S245 follows the step S242 in the case where the directory server 104 includes the user information corresponding to the user 200 as a result of the determination in the step S242. In the step S245, the authentication processing functioning part 12 produces MFP login user information illustrated in FIG. 11 based on the management data received from the LDAP communication operation part 14 in the step S239.

Specifically, the authentication processing functioning part 12 sets the user name, the display name and the mail among the respective pieces of information of the management data (received management data) illustrated in FIG. 10 as the user name, the display name and the mail of the MFP login user information illustrated in FIG. 11. The authentication processing functioning part 12 sets manager authorization (for example, Administrator) to the authorization of the MFP login user information illustrated in FIG. 11 in the case where the group of the management data (received management data) illustrated in FIG. 10 is a particular group. The authentication processing functioning part 12 sets the domain in the connected directory server 104 to the domain of the MFP login user information illustrated in FIG. 11. The authentication processing functioning part 12 stores the MFP login user information set and illustrated in FIG. 11 in the MFP login user information part 123.

Subsequently, in the step S246, the authentication processing functioning part 12 delivers the MFP login user information stored in the MFP login user information part 123 to the CPU 301 of the MFP 101 to request for login processing.

Subsequently, in the step S247, the authentication processing functioning part 12 requests, for example, the CPU 301 of the MFP 101 for screen transition processing by the operation part 330.

Figure 15:
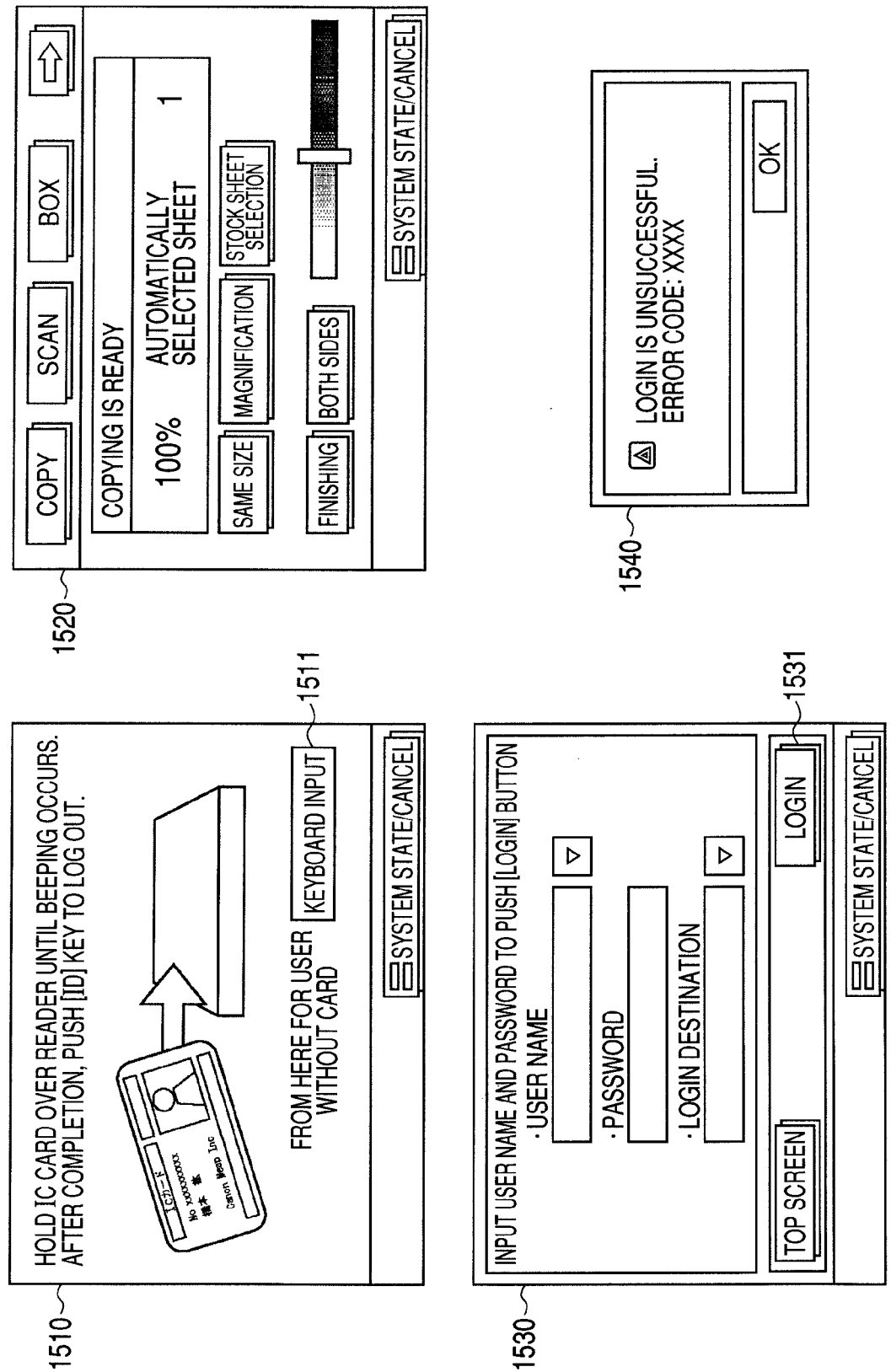
FIG. 15 includes image diagrams exemplifying display screen displayed in the operation part of the MFP.

FIG. 15 includes image diagrams exemplifying display screen displayed in the operation part 330 of the MFP 101. A login screen 1510 illustrated in FIG. 15 is a screen displayed at the occasion of starting authentication processing. AN MFP use screen 1520 is displayed at the occasion when the user authentication is granted. A keyboard input screen 1530 is displayed at the occasion when a "keyboard input" button on the login screen 1510 is held down. An error screen 1540 is displayed at the occasion of notifying the user 200 of an error.

In the screen transition process in the step S247, the login screen 1510 in FIG. 15 is switched to the MFP use screen 1520 for display.

By the processes of the flow chart illustrated in FIG. 13A to FIG. 13C described above, IC card authentication in the authentication system 100 of the present embodiment is carried out.

Next, keyboard authentication process procedure will be described.

Figure 16A:
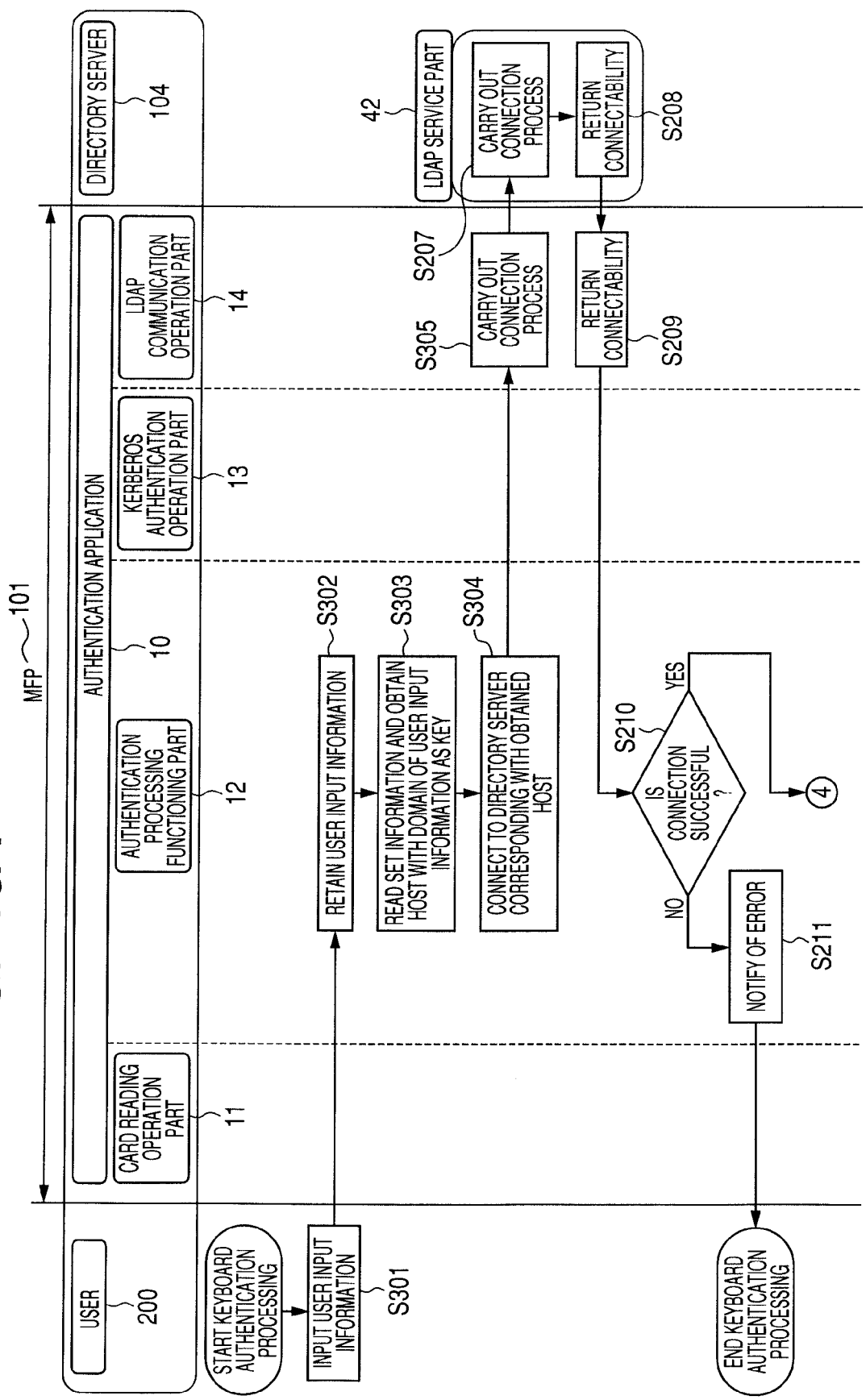
FIG. 16A is a flow chart exemplifying process procedure in keyboard authentication of the authentication system according to the first embodiment of the present invention.
Figures 2, 16B:
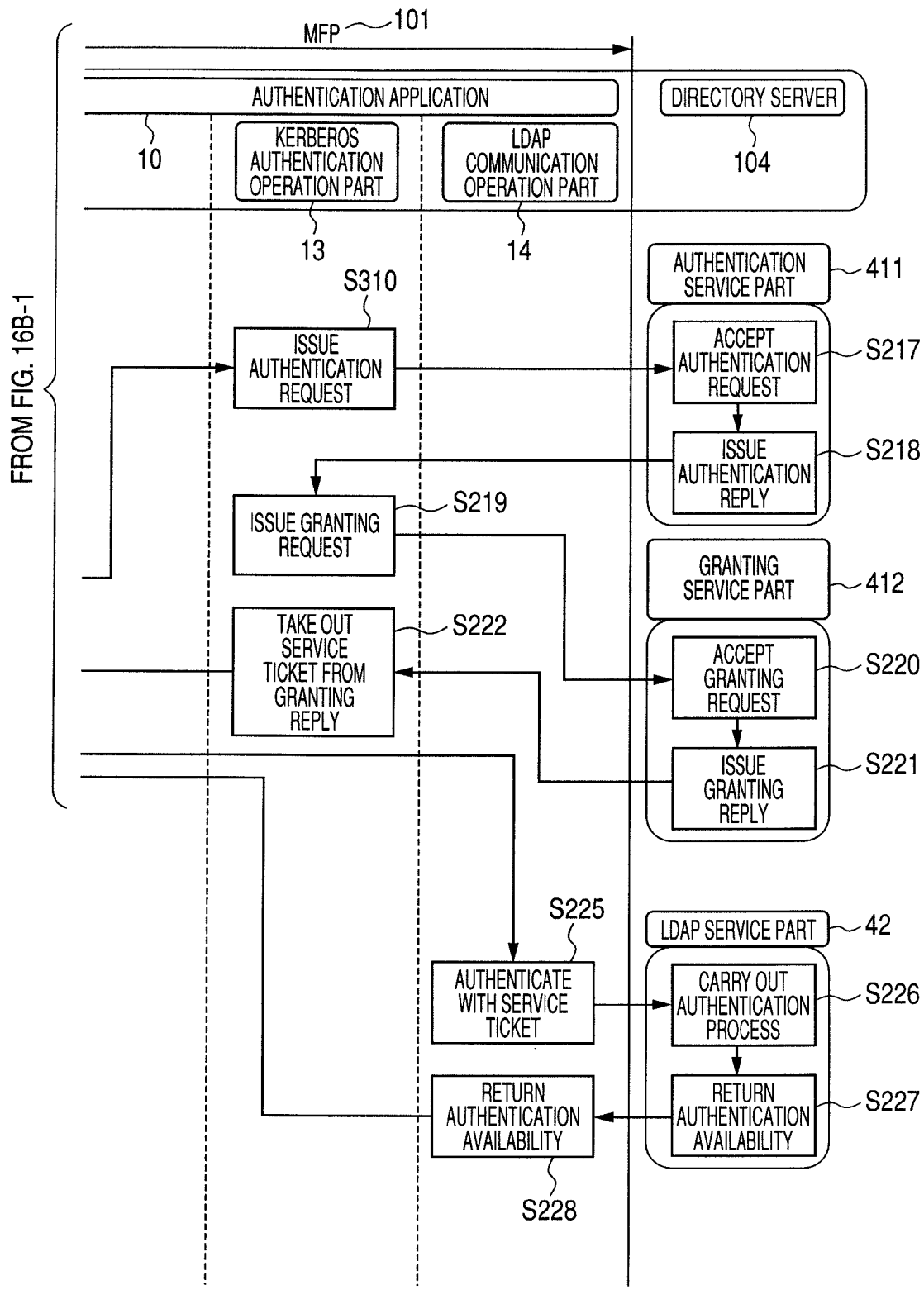
FIG. 16B comprising
Figure 16C:
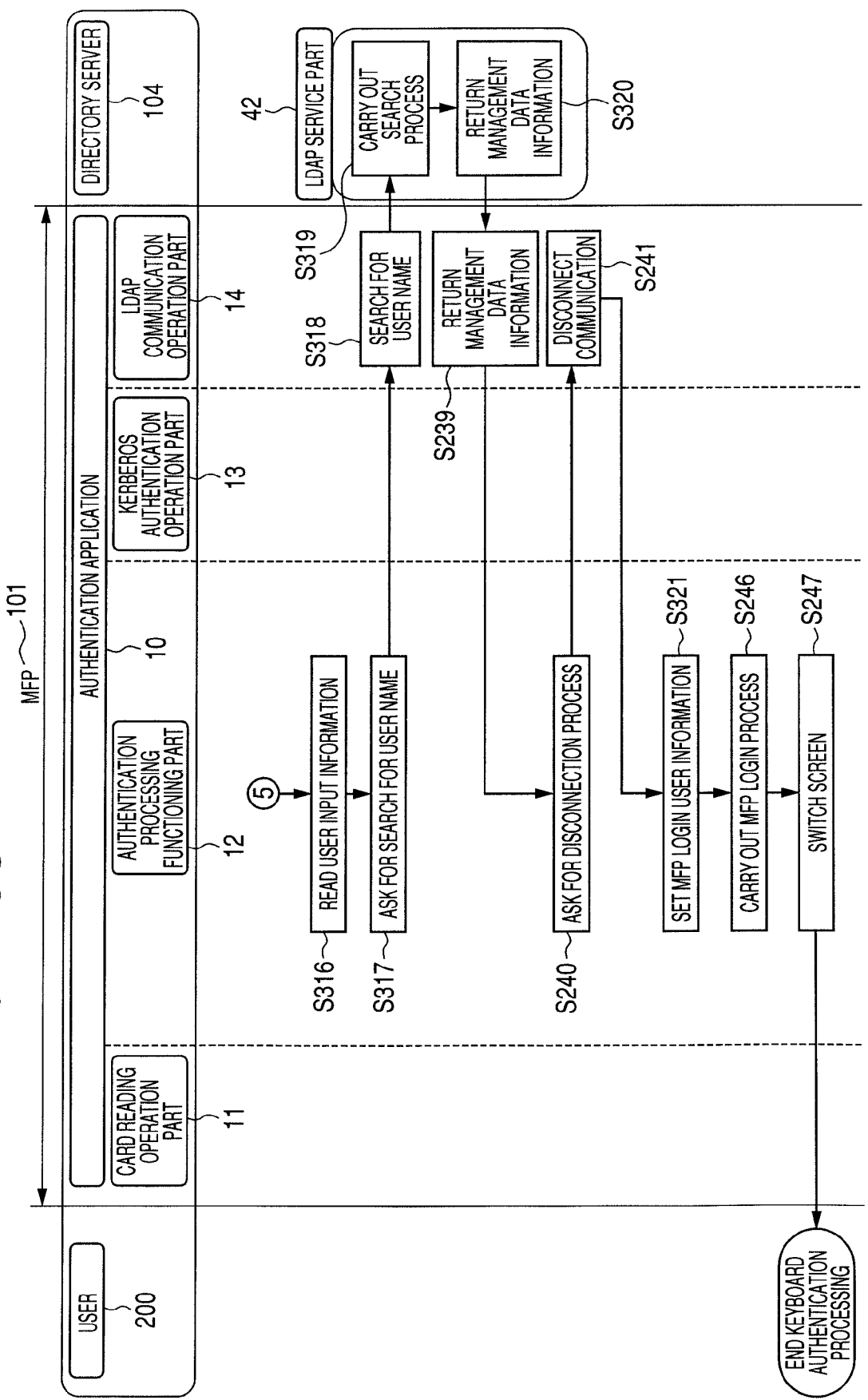
FIG. 16C is a flow chart exemplifying the process procedure in the keyboard authentication of the authentication system according to the first embodiment of the present invention in succession to FIGS. 16B-1 and 16B-2.

FIG. 16A to FIG. 16C are flow charts exemplifying process procedure in keyboard authentication of the authentication system according to the first embodiment of the present invention. In the flow charts illustrated in FIG. 16A to FIG. 16C, the user 200 illustrated in the upper part of the respective drawings, the respective function frameworks (11 to 14) in the authentication application 10 and the processing in the directory server 104 are illustrated in a vertically divided manner. Like step numbers designate the same step numbers in FIG. 16A to FIG. 16C and FIG. 13A to FIG. 13C.

When the user 200 holds "keyboard input" button 1511 down on the login screen 1510 displayed by the operation part 330, the keyboard input screen 1530 is displayed by the operation part 330 to start processing in keyboard authentication. When the user 200 inputs the user name, the password and the login destination on the keyboard input screen 1530 to hold the login button 1531 down, the authentication processing functioning part 12 detects information on the input user name, the password and the login destination as the user input information illustrated in FIG. 8 in the step S301 in FIG. 16A. At that occasion, the authentication processing functioning part 12 detects the information of the input login destination as the information of the domain as illustrated in FIG. 8.

Subsequently, in the step S302, the authentication processing functioning part 12 stores the user input information detected in the step S301 in the user input information part 124.

Subsequently, in the step S303, the authentication processing functioning part 12 reads a plurality of pieces of set information retained in the set information part 125 in the step S102 in FIG. 12 to obtain information on the host from the corresponding set information with the domain (information of the login destination) of the user input information stored in the step S302 as a key. Thereby, one directory server 104 to be connected is determined in keyboard authentication.

Subsequently, in the step S304, the authentication processing functioning part 12 asks the LDAP communication operation part 14 for processing of connection to the directory server 104 corresponding to the information on the host obtained in the step S303.

Subsequently, in the step S305, the LDAP communication operation part 14 carries out connection processing to the directory server 104 corresponding to the information on the host asked for in the step S304.

Thereafter, likewise the case of the IC card authentication, processing of the step S207 to the step S211 illustrated in FIG. 13A is carried out and, thereafter, followed by the step S306 in FIG. 16B-1.

In the step S306, the authentication processing functioning part 12 reads user input information stored in the user input information part 124 in the step S302 and illustrated in FIG. 8.

Subsequently, in the step S307, the authentication processing functioning part 12 obtains the domain, the user name and the password from the user input information illustrated in FIG. 8 to carry out a search process on whether or not a service ticket based on the obtained information is cached in the keyboard ticket cache part 122. The search process in the step S307 hashes the domain, the user name and the password with hash function to carry out processing of searching the keyboard ticket cache part 122 with the obtained key as a key for presence of a service ticket corresponding to the relevant key.

Subsequently, in the step S308, the authentication processing functioning part 12 determines presence of a service ticket based on the obtained user input information in the keyboard ticket cache part 122 in the search process in the step S307.

The step S309 follows the step S308 in the case where no service ticket based on the obtained user input information is present in the keyboard ticket cache part 122 as a result of the determination in the step S308. In the step S309, the authentication processing functioning part 12 delivers the user input information read in the step S306 to the Kerberos authentication operation part 13 to make a request for issuance of the service ticket. The user input information (the user name and the password) read in the step S306 is used for this issuance request.

Subsequently, in the step S310, the Kerberos authentication operation part 13 receives the user input information (specifically, the domain, the user name and the password of the user input information) from the authentication processing functioning part 12 to produce an authentication request based on the user name and the password of the relevant user input information. The Kerberos authentication operation part 13 issues the produced authentication request to the authentication service part 411 managed by the key distribution station 41 of the directory server 104 of the designated domain through the network 105. Specifically, in the step S310, if the management data illustrated in FIG. 10 includes corresponding user name and password, the corresponding directory server 104 is determined to allow authentication. Thereafter, in the step S218, the corresponding directory server 104 replies with availability of authentication. On the other hand, in the case where the password is wrong, the directory server 104 is determined not to allow authentication and thereafter the directory server 104 replies with unavailability of authentication in the step S218.

Thereafter, likewise the case of the IC card authentication, processing of the step S217 to the step S222 illustrated in FIG. 13B-2 is carried out and, thereafter, followed by the step S312 in FIG. 16B-1.

On the other hand, the step S311 follows the step S308 in the case where a service ticket based on the obtained user input information is present in the keyboard ticket cache part 122 as a result of the determination in the step S308. In the step S311, the authentication processing functioning part 12 takes out the corresponding service ticket from the keyboard ticket cache part 122.

The step S312 follows the step S222 and the step S311 in one of the case where the process in the step S222 is finalized and the case where the process in the step S311 is finalized. In the step S312, the authentication processing functioning part 12 delivers the service ticket obtained in one of the step S222 and the step S311 to the LDAP communication operation part 14 to make an authentication request.

Thereafter, likewise the case of the IC card authentication, processing of the step S225 to the step S229 illustrated in FIG. 13B-1 is carried out.

The step S313 follows the step S229 in the case where the authentication is unsuccessful (that is, failure) as a result of the determination in the step S229. In the step S313, the authentication processing functioning part 12 searches the service ticket cache (that is, the keyboard ticket cache part 122 for the present embodiment) illustrated in FIG. 14 for the service ticket with the corresponding key to delete the relevant service ticket.

Subsequently, in the step S314, the authentication processing functioning part 12 determines whether or not the authentication that is asked for in the step S312 is obtained with the service ticket cached in the keyboard ticket cache part 122 in advance.

The step S309 is reinstated and is followed by the processing for newly obtaining a service ticket in the case where the authentication that is asked for in the step S312 is obtained with the service ticket cached in the keyboard ticket cache part 122 in advance as a result of the determination in the step S314.

On the other hand, the step S232 follows the step S314 in the case where the authentication that is asked for in the step S312 is not obtained with the service ticket cached in the keyboard ticket cache part 122 in advance as a result of the determination in the step S314. Likewise the case of the IC card authentication, the error notifying process in the step S232 illustrated in FIG. 13B-1 is carried out.

On the other hand, the step S315 follows the step S229 in the case where the authentication is successful as a result of the determination in the step S229. In the step S315, the authentication processing functioning part 12 updates the service ticket cache (that is, the keyboard ticket cache part 122 for the present embodiment) illustrated in FIG. 14. The contents of the specific update processing in this step S315 is likewise the step S233 in the case of the IC card authentication.

The step S316 illustrated in FIG. 16C follows the step S315 after completion of the process. In the step S316, the authentication processing functioning part 12 reads the user input information stored by the user input information part 124 in the step S302.

Subsequently, in the step S317, the authentication processing functioning part 12 delivers the user input information read in the step S316 to the LDAP communication operation part 14 to make a search request for the user name. Here, this search request grants use of the relevant MFP 101 to the user 200 who carries out an operation of inputting the user input information from the operation part 330.

Subsequently, in the step S318, the LDAP communication operation part 14 takes out a user name from the user input information received from the authentication processing functioning part 12 in the step S317 and delivers the user name to the LDAP service part 42 to make a search request for the user name.

Subsequently, in the step S319, the LDAP service part 42 searches the management data (user management information) illustrated in FIG. 10 and stored in the management data memory 43 for the management data corresponding, in user name, to the user input information received from the LDAP communication operation part 14 in the step S318.

Subsequently, in the step S320, the LDAP service part 42 replies to the LDAP communication operation part 14, through the network 105, with the management data (for example, user name) searched on the LDAP communication operation part 14 in the step S319 as the management data information. At that occasion, as a result of a search in the step S319, in the case where no relevant management data is present, information to the effect that no relevant management data is present is replied as the management data information to the LDAP communication operation part 14.

Thereafter, likewise the case of the IC card authentication, processing of the step S239 to the step S241 illustrated in FIG. 13C is carried out and, thereafter, followed by the step S321.

In the step S321, the authentication processing functioning part 12 produces and sets MFP login user information illustrated in FIG. 11 based on the management data (for example, the user name) received from the LDAP communication operation part 14 in the step S239. The specific contents of the processing in this step S321 is likewise the step S245 in the case of the IC card authentication.

Thereafter, likewise the case of the IC card authentication, the processing in the step S246 and the step S247 illustrated in FIG. 13C is carried out.

By the processes of the flow chart illustrated in FIG. 16A to FIG. 16C described above, keyboard authentication in the authentication system 100 of the present embodiment is carried out.

Here, in the case where authentication is successful in the step S229 in FIG. 16B-1 in the keyboard authentication illustrated in FIG. 16A to FIG. 16C, authentication with the user input information is successful at this stage. Therefore, determination in IC authentication in the step S242 in FIG. 13C is not carried out. On the contrary, in the case where authentication is successful in the step S229 in FIG. 13B-1 in the IC card authentication illustrated in FIG. 13A to FIG. 13C, only authentication with the setting information other than the card information of the IC card is successful at this stage. Therefore, thereafter, authentication with the card information is carried out in the step S234 and forward in FIG. 13C so that the result of the relevant authentication will be determined in the step S242 in FIG. 13C.

FIG. 17 is a schematic diagram describing service ticket cache processing in one of an IC card ticket cache part 121 and a keyboard ticket cache part 122.

Specifically, in FIG. 17, the key producing process at the occasion of registering and searching for a service ticket hashes the domain, the user name and the password with hash function to obtain values as keys in the cache update processing in one of the step S315 and the step S233. Being related to the relevant key, the service ticket is cached.

Figure 18:
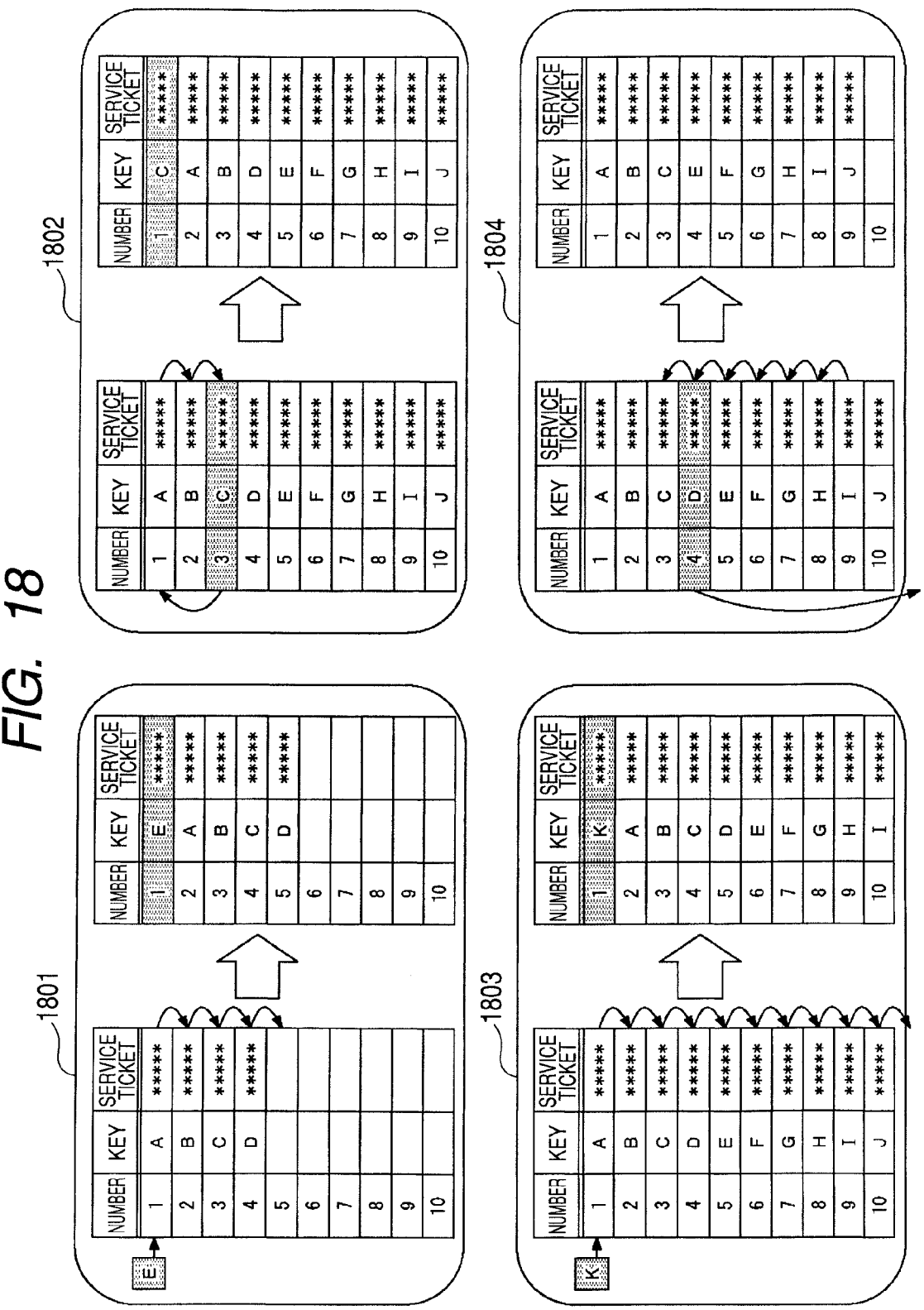
FIG. 18 is a schematic diagram exemplifying a cache method in one of an IC card ticket cache part and a keyboard ticket cache part.

FIG. 18 is a schematic diagram exemplifying a cache method in one of an IC card ticket cache part 121 and a keyboard ticket cache part 122.

For example, in the case where the service ticket cache illustrated in FIG. 14 does not include the service ticket used for authentication, the relevant service ticket is stored in the top (number 1) as illustrated in the cache method 1801 in FIG. 18. The service ticket stored in advance is stored in the one number lower. Here, at this occasion, in the case where the service ticket cache illustrated in FIG. 14 reaches the cache upper limit (10 units in the example illustrated in FIG. 14), the relevant service ticket is stored in the top (number 1) after deleting the service ticket stored in the end (number 10) as illustrated in the cache method 1803 in FIG. 18.

In addition, for example, in the case where the service ticket cache illustrated in FIG. 14 includes the service ticket used for authentication, the relevant service ticket is moved to the top (number 1) as illustrated in the cache method 1802 in FIG. 18. In addition, in the case of failure in authentication with the stored service ticket in the service ticket cache illustrated in FIG. 14, the relevant service ticket is deleted from the service ticket cache as illustrated in the cache method 1804 in FIG. 18.

As described above, the MFP (image forming apparatus) 101 of the present embodiment includes the framework as described below.

The card reader (reading means) 340 reads the card information illustrated in FIG. 6 corresponding to the user identifying information from the IC card corresponding to the authentication card.

The set information part (login information memory means) 125 stores set information (first login information) used for authentication of the card information read by the card reader 340 and illustrated in FIG. 7 for login to the directory server (authentication server) 104. Here, the set information illustrated in FIG. 7 includes information of the user name (user identification information) and the password.

The operation part (operation means) 330 accepts an input operation of the user input information (second login information) illustrated in FIG. 8 including at least the user name (user authentication information) and the password according to the operation by the user 200.

The Kerberos authentication operation part 13 requests for a service ticket (authentication ticket) utilized for authentication at the occasion of login to the directory server 104 with one of the set information (first login information) illustrated in FIG. 7 and the user input information (second login information) illustrated in FIG. 8 in the case of login to the directory server 104 (the step S219 in one of FIG. 13B-2 and FIG. 16B-2). The Kerberos authentication operation part 13 for requesting for this service ticket is included in the ticket request means.

The LDAP communication operation part 14 requests the directory server 104 for authentication with the service ticket obtained by the request of the Kerberos authentication operation part 13 (the step S225 in one of FIG. 13B-2 and FIG. 16B-2). The LDAP communication operation part 14 for making this authentication request is included in the authentication request means.

In the case where authentication with the service ticket for the directory server 104 by a request by the LDAP communication operation part 14 is successful (the step S229/YES in one of FIG. 13B-2 and FIG. 16B-1), the authentication processing functioning part 12 requests the directory server 104 for a search for management data (user management information) illustrated in FIG. 10 with information of one of card information read by the card reader 340 and illustrated in FIG. 6 and information of the user name of the user input information illustrated in FIG. 8 (one of the step S235 in FIG. 13C and the step S317 in FIG. 16C). That is, the authentication processing functioning part 12 requests the directory server 104 for a search for granting use of the relevant MFP 101 to one of the user of the IC card and the user who carries out an operation of inputting the user input information from the operation part 330. The authentication processing functioning part 12 for making this search request is included in the search request means.

Such a framework enables authentication with one directory server 104 for storing the management data of the user in both of the case of IC card authentication and the case of keyboard authentication. That is, one directory server 104 being a authentication server for storing the management data of the user can any authentication with a plurality of authentication methods. Thereby, the management data memory 43 can manage the user information collectively and can realize reduction in operation management cost without requiring installation of its own authentication server. In the case of IC card authentication, a password and the other information are set for the set information (first login information) illustrated in FIG. 7. Thereby, the necessity of storing the password and the other information in the IC card will be eliminated so that problems on security can be avoided. By caching the authentication ticket (service ticket) to cause the directory server 104 side to carry out authentication related to login with that cached authentication ticket, more decrease in authentication time can be planned than the case of carrying out the relevant authentication with an MFP and occurrence of increase in authentication time can be avoided. Authentication with the authentication ticket (service ticket) can establish robust secured authentication environment.

Moreover, in the MFP 101 of the present embodiment, in the case of login to the relevant image forming apparatus with the card information (user identifying information) read by the card reader 340, the authentication processing functioning part 12 controls so that the set information (first login information) illustrated in FIG. 7 is delivered to the Kerberos authentication operation part 13 being ticket request means (the step S215 in FIG. 13B-1). On the other hand, in the case of login to the relevant image forming apparatus with the user input information (second login information) illustrated in FIG. 8, the authentication processing functioning part 12 controls so that the relevant user input information is delivered to the Kerberos authentication operation part 13 being ticket request means (the step S309 in FIG. 13B). The authentication processing functioning part 12 for carrying out this control is included in authentication control means.

Moreover, the MFP 101 of the present embodiment includes an IC card ticket cache part (first ticket cache means) 121 for caching the service ticket obtained with the set information (first login information) illustrated in FIG. 7 and a keyboard ticket cache part (second ticket cache means) 122 for caching the service ticket obtained with the user input information (second login information) illustrated in FIG. 8. At this occasion, the authentication processing functioning part 12 determines whether or not the IC card ticket cache part 121 cashes the authentication ticket (service ticket) obtained with the set information (first login information) illustrated in FIG. 7 in the case where the card reader 340 reads the card information (user identifying information) (first determination) (the step S214 in FIG. 13B-1) and determines whether or not the keyboard ticket cache part 122 cashes the authentication ticket (service ticket) obtained with the relevant user input information in the case where the operation part 330 accepts input operation for inputting user input information (second login information) illustrated in FIG. 8 (second determination) (the step S308 in FIG. 16B-1).

In the case where one of the IC card ticket cache part 121 and the keyboard ticket cache part 122 cashes a service ticket for requesting for authentication, the LDAP communication operation part 14 being authentication request means requests the directory server 104 for authentication with the relevant service ticket (one of the step S225 based on the steps S223 and S224 in FIG. 13B-1 and the step S225 based on the steps S311 and S312 in FIG. 16B-1).

Such a framework enables use for many occasions of the service ticket once cached in the ticket cache part. Therefore, the necessity of obtaining a service ticket from the directory server 104 is eliminated so that further reduction in authentication time can be planned.

Moreover, in the MFP 101 of the present embodiment, in the case where the LDAP communication operation part 14 successfully requests the directory server 104 for authentication (the step S229/YES in one of FIG. 13B-1 and FIG. 16B-1), the authentication processing functioning part 12 controls and updates the service ticket of one of the IC card ticket cache part 121 and the keyboard ticket cache part 122 caching the service ticket used for the relevant authentication (one of the step S233 in FIG. 13B-1 and the step S315 in FIG. 16B-1). On the other hand, in the case where the LDAP communication operation part 14 fails in requesting the directory server 104 for authentication (the step S229/NO in one of FIG. 13B-1 and FIG. 16B-1), the authentication processing functioning part 12 controls and deletes the service ticket used for the relevant authentication from one of the IC card ticket cache part 121 and the keyboard ticket cache part 122 caching the service ticket used for the relevant authentication (one of the step S230 in FIG. 13B-1 and the step S313 in FIG. 16B-1). The authentication processing functioning part 12 for updating and deleting this service ticket is included in cache control means.

Next, an applied example in the authentication system 100 of the present embodiment will be described.

Figure 19:
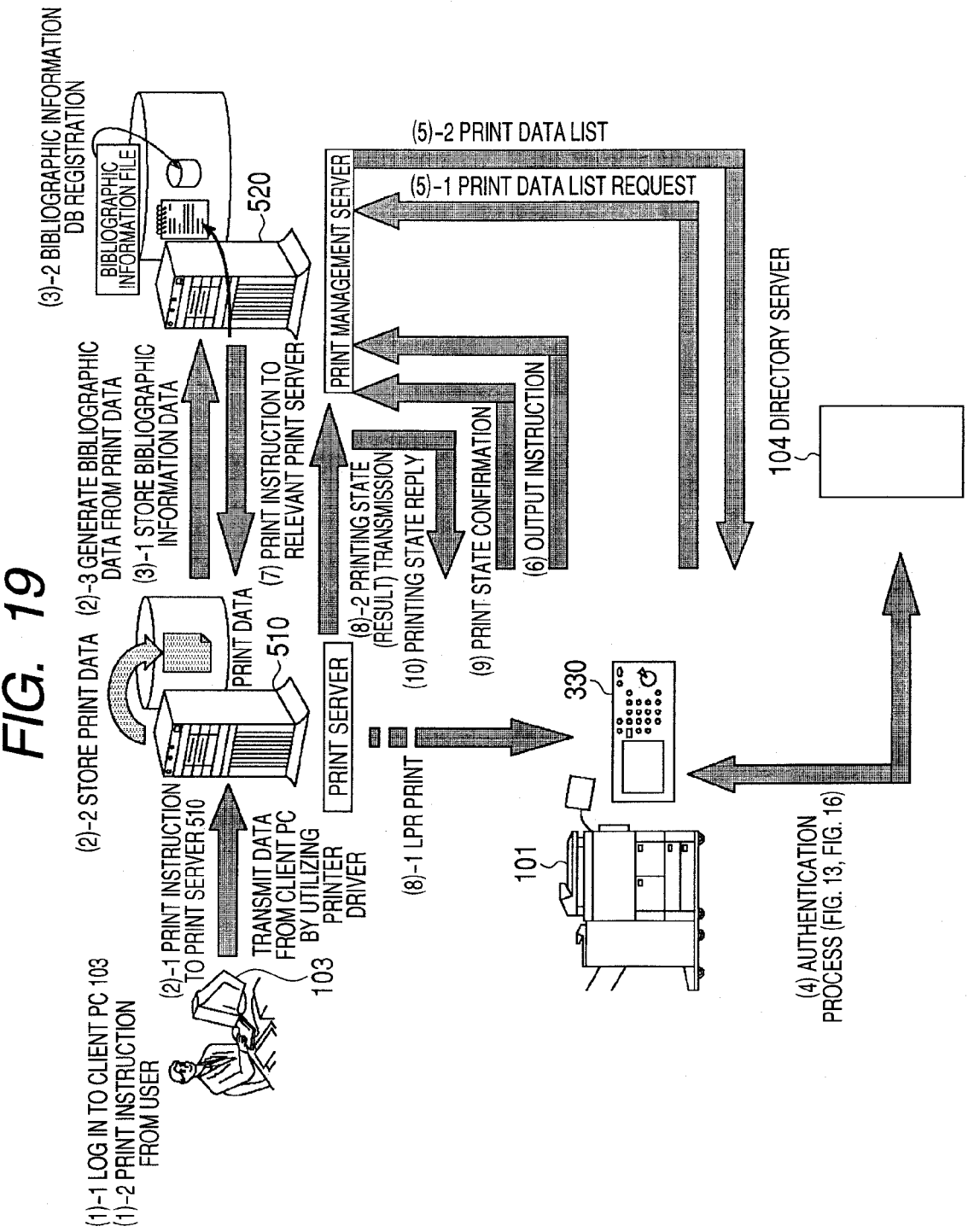
FIG. 19 is an appearance diagram illustrating an applied example of the authentication system according to the first embodiment of the present invention.
Figure 20:
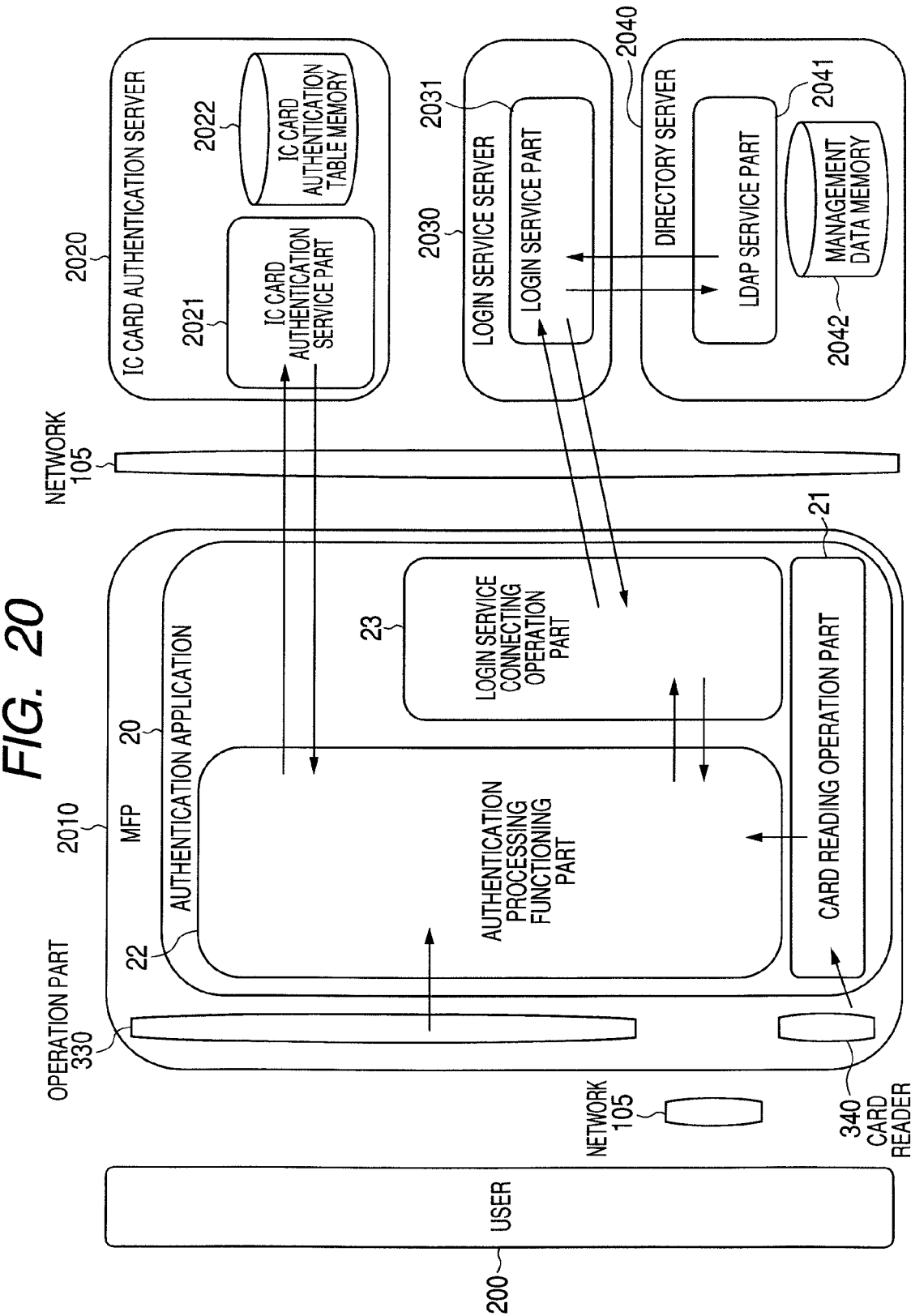
FIG. 20 is a schematic diagram exemplifying a skeleton framework of an authentication system for realizing the IC card authentication and the keyboard authentication in the background art.

FIG. 19 is an appearance diagram illustrating an applied example of the authentication system according to the first embodiment of the present invention. Like reference numerals designate the same or similar apparatuses in FIG. 1 and FIG. 19. That is, the stage (4) authentication process in FIG. 19 to be described below undergoes processes in FIG. 13A to FIG. 13C, FIG. 16A to FIG. 16C and FIG. 21A to FIG. 22 to be described with the second embodiment to be described below.

The authentication system (print system) illustrated in FIG. 19 includes a print server 510 for storing print data and a print management server 520 for generating a print data list on each user in addition to the MFP 101, the client PC 103 and the directory server 104. In addition, the authentication system illustrated in FIG. 19 includes a network 105 (not illustrated in the drawing) mutually and communicably connecting the MFP 101, the client PC 103, the directory server 104, the print server 510 and the print management server 520.

At first, the user logs in to client PC 103 (the stage (1)-1) and gives a print instruction to a logical printer corresponding to a printer driver being set as a print destination by an application program executed by the relevant client PC 103 (the stage (1)-2). According to this print instruction, the application program of the client PC 103 transmits data to the printer driver through a graphic engine. The printer driver of the client PC 103 generates print data based on data received from the relevant application program through the graphic engine.

The client PC 103 transmits the generated print data to the print server 510 (the stage (2)-1). The print server 510 stores the received print data into a predetermined repository (the stage (2)-2). Here, for example, mechanism of LPR printing is adopted for transmission from the client PC 103 to the print server 510. The print server 510 does not transmit to the MFP 101 being a printer in spite that the print data is stored in the above described predetermined repository.

Subsequently, the print server 510 extracts (generates) bibliographic information data from the print data received from the client PC 103 and stored in the above described predetermined repository (the stage (2)-3) and transmits the relevant extracted (generated) bibliographic information data to the print management server 520. The print server 510 causes the print management server 520 to store the bibliographic information data in the predetermined repository (a directory being set in advance) of the print management server 520 as a bibliographic information file with a file-sharing mechanism on the network 105.

Subsequently, the print management server 520 monitors the above described predetermined directory. When the print server 510 stores the bibliographic information file in the relevant predetermined directory, the print management server 520 analyzes the relevant bibliographic information file to register the bibliographic information in the bibliographic information DB being established on an external memory of the print management server 520 (the stage (3)-2). This bibliographic information DB stores and manages information (pass) for specifying print job information of the print server 510, the output user name and job name, time stamp of the print data being unique information for being managed by the print management server 520 and the like.

The MFP 101 transmits a request to the print management server 520 for a print data list (the stage (5)-1) when the IC card authentication process illustrated in FIG. 13A to FIG. 13C and the keyboard authentication process illustrated in FIG. 16A to FIG. 16C and an authentication process in FIGS. 21A, 21B and FIG. 22 to be described with the second embodiment described below grant use of the relevant MFP 101 (the stage (4)). This request for the print data list includes the authentication user name (user ID).

Subsequently the print management server 520 receives the request for the print data list from the MFP 101 and then searches for the bibliographic information DB with the user name (user ID) included in the relevant request for the print data list. The print management server 520 generates the print data list corresponding to the relevant user name (user ID) to reply to the MFP 101 (the stage (5)-2).

The MFP 101 receives the print data list from the print management server 520 and then displays the relevant print data list onto the UI of the operation part 330. The user 200 who is allowed to use the MFP 101 operates the operation part 330 to select the print data to give a print instruction. Then the MFP 101 transmits a request for printing the relevant selected print data (output instruction) to the print management server 520 (the stage (6)). Here, this print request will include the user name (user ID) and the time stamp of the print data.

The print management server 520 receives a request for printing the print data (output instruction) from the MFP 101 and then searches the bibliographic information DB for bibliographic information on the print data having undergone the relevant output instruction with the user name (user ID), the time stamp of the print data as keys. The print management server 520 identifies the print server 510 storing the relevant print data from the searched bibliographic information to transmit the print instruction of the relevant print data to the identified print server 510 (the stage (7)). The above described time stamp is provided at the occasion where the print server 510 receives the print data.

The print server 510 receives the print instruction from the print management server 520 and then transmits the print data to the MFP 101 which has transmitted a request for printing based on the relevant print instruction to cause the MFP 101 to carry out print processing (LPR print processing) (the stage (8)-1).

The print server 510 transmits a printing state (result) (message on the print result) to the print management server 520 (the stage (8)-2) after finalization of the LPR print (the stage (8)-1). The print management server 520 in receipt of this printing state (result) (message on the print result) memorizes and retains information on the relevant printing state (result) (message on the print result) in one of the HDD and the RAM of its own apparatus.

On the other hand, the MFP 101 gives the output instruction to the print management server 520 (the stage (6)) and, thereafter, requests the print management server 520 for confirmation on the printing state (the stage (9)). This print state confirmation is requested to the print management server 520 from the MFP 101 every constant period.

The print management server 520 transmits (the stage (10)), to the MFP 101, the printing state (result) memorized and retained in one of the above described HDD and RAM based on the print state confirmation request from the MFP 101 (the stage (9)). The MFP 101 memorizes and stores the printing state (result) received from the print management server 520 in one of the HDD 304 and the RAM 302 and displays that on the operation part 330.

Here, for the authentication system illustrated in FIG. 19, a mode where the print server 510 and the print management server 520 are included in one server is also applicable.

The authentication system according to the present embodiment can be operated with the directory server 104 already owned by a company at the occasion of introducing the relevant authentication system. Therefore, no particular authentication server only for the present authentication system will be required so that reduction in the operation management cost can be realized and the operation management will become simple.

Second Embodiment

Next, a second embodiment of the present invention will be described.

For the second embodiment to be described below, processing for planning reduction in authentication time (or, processing for avoidance of giving rise to an increase in authentication time) will be described with FIG. 21A to FIG. 25 in the authentication system 100. Here, the processing in FIG. 13C for the first embodiment is replaced by the processing of FIGS. 21A and 21B (including FIG. 22) for the second embodiment and thereby, the relevant second embodiment is realizable. Therefore, the second embodiment is similar to the first embodiment, for example, in the processes besides the process illustrated in FIGS. 21A and 21B (including FIG. 22), the system framework of the authentication system 100 and the hardware framework. Therefore, detained description thereon will be omitted.

Figure 21B:
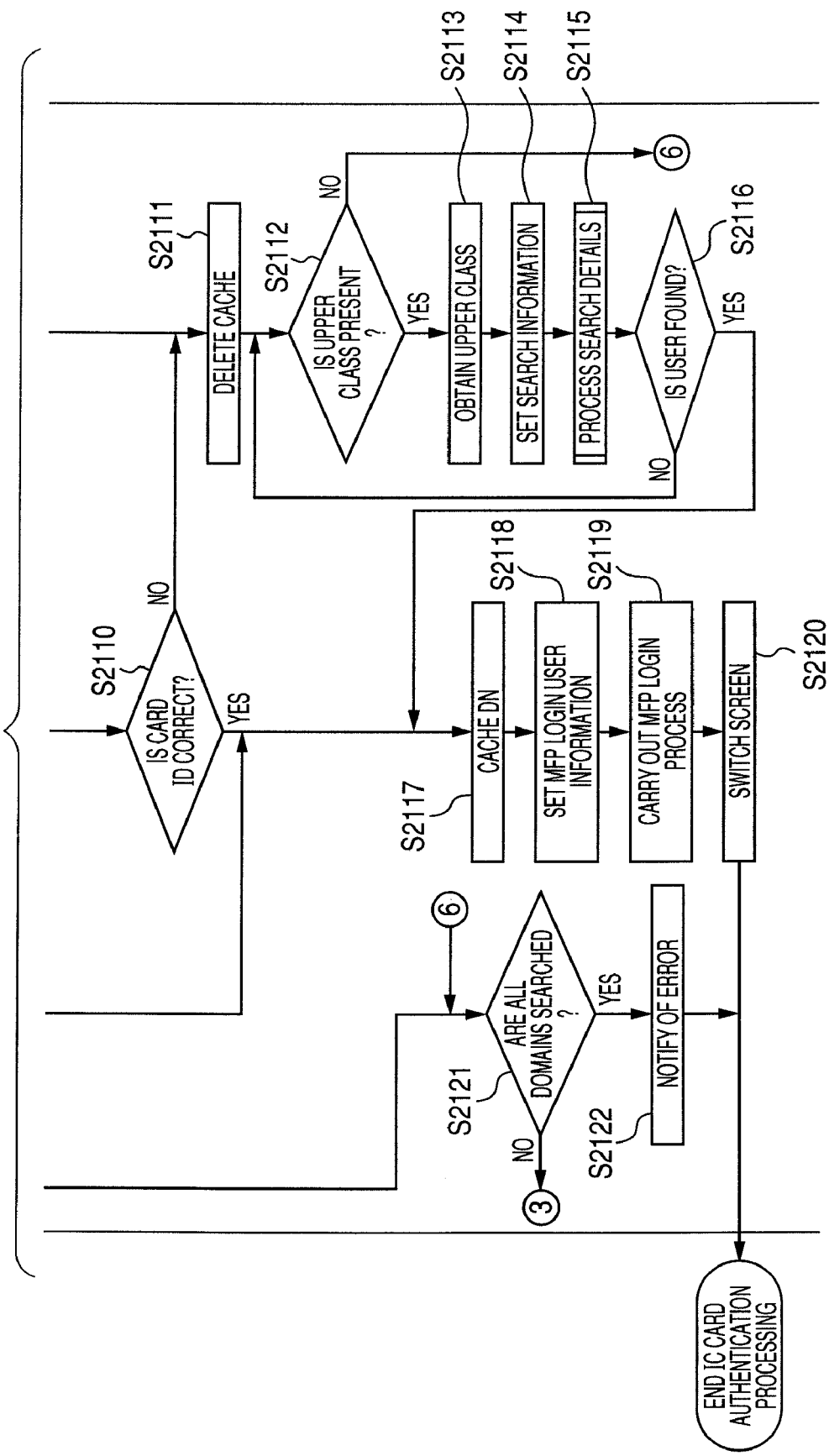

FIGS. 21A and 21B are a flow chart exemplifying process procedure in IC card authentication of an authentication system according to the second embodiment of the present invention. FIG. 22 is a flow chart exemplifying detailed process procedure in the search detail process illustrated in FIGS. 21A and 21B. In the flow charts illustrated in FIG. 21A, 21B and FIG. 22, the processing in the user 200 illustrated in the upper part of each drawing, the respective function frameworks (11 to 14) in the authentication application 10 and the directory server 104 is illustrated in a vertically divided manner. Here, the processing up to the step S2101 follows the step S233 in FIG. 13B-1 and likewise the first embodiment. Therefore, description thereon will be omitted.

The second embodiment will be exemplified to include processing with card information but can include processing for the occasion when, for example, the keyboard of the operation part 330 inputs user information. This case is realizable by replacing the card information with the user name being input by the operation part 330. In this case, the card ID in FIG. 23 to be described later will be replaced by the user name. This replacement will enable determination on presence of DN (this DN will be described later) corresponding to the user name of the input user information in the case where the keyboard of the operation part 330 inputs the user information. That is, in the case where the DN is present, the DN is set to the search condition. In the case where no DN is present, the user name and the domain name of the user information being input to the search position are set to the search condition.

The processing of the step S233 in FIG. 13B-1 is finalized. Then, in the step S2101 in FIG. 21A, the authentication processing functioning part 12 reads the card information (card ID) stored in the card information part 126 in the step S203. This processing is similar to the processing of the step S234 in FIG. 13C.

Subsequently, in the step S2102, the authentication processing functioning part 12 confirms and determines presence of the card information read in the step S2101 inside the DN cache illustrated in FIG. 23.

FIG. 23 is a schematic diagram exemplifying DN cache information being present inside a storage region managed by the authentication processing functioning part 12 in FIG. 4, that is, an HDD 304 in FIG. 3. This DN cache retains combination of the respective information of the card ID and the user DN. The card ID is a unique number belonging to the IC card and is illustrated in FIG. 6 for example. The user DN will be described below.

Figure 25:
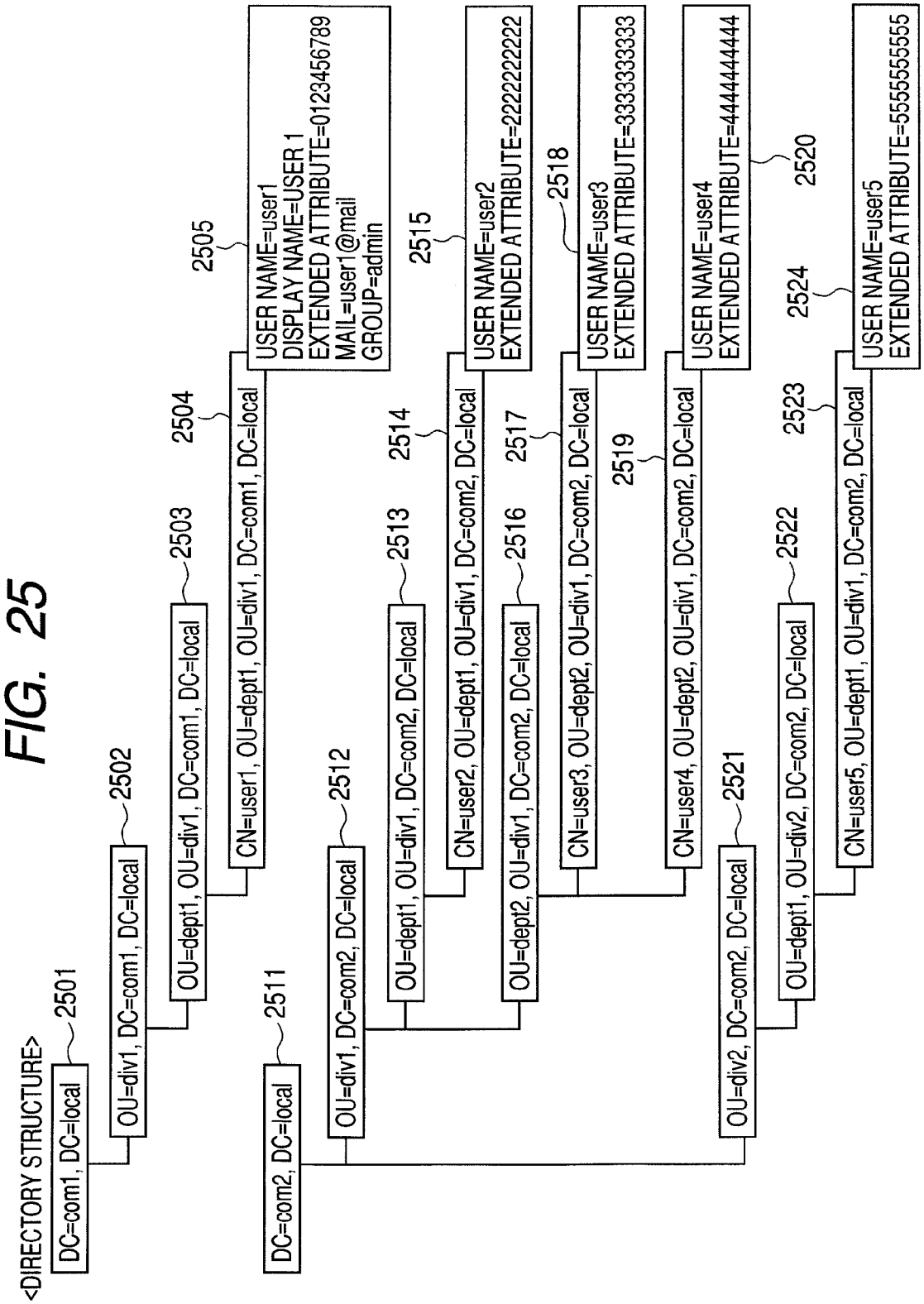
FIG. 25 is a schematic diagram exemplifying directory structure inside the management data memory in FIG. 4.

FIG. 25 is a schematic diagram exemplifying directory structure inside the management data memory 43 in FIG. 4. As illustrated in FIG. 25, the directory server 104 manages information in the hierarchical structure. In the case of expressing the respective components of the hierarchical structure, different names will be used according to property. For example, in the case where the component is an organization, a DC (Domain Component) is used. In the case where the component is one unit of an organization, an OU (Organization Unit) is used. In the case where the component is an entry (user information), a CN (Common Name) is used. The types and quantity of those components vary depending on the organization so as to enable designing without restraint. Here, a simple example is illustrated with general components.

In the case of designating the component, a DN (Distinguished Name) is used. This DN specifies a position inside the hierarchical structure, which the relevant component belongs to, and, for example, by arranging the component names from the backward in order and linking the names with commas. This DN is unique inside the directory. That is, the DN is an identification name for uniquely identifying particular information inside a directory. Here, this DN is a search position designated in order to search for a user and comprises user information (user name). The DN is also called an LDAP identification name.

The DN of the component 2502 will be described with reference to FIG. 25 below.

The component 2502 is a component called "OU=div1" and is a component being present immediately under the component 2501 called "DC=com1, DC=local" when viewed from the hierarchical structure. In this case, the DN of the component 2502 will be "OU=div1, DC=com1, DC=local". Use of this DN enables distinction of the component inside the hierarchical structure. For example, the component 2502 and the component 2512 have the same "OU=div1" and can distinguish the respective components as "OU=div1, DC=com1, DC=local", "OU=div1, DC=com2, DC=local" by expressing with the DN.

Every component can include attribute. In description with an example in FIG. 25, an attribute 2505 is the attribute of the component 2504. The example illustrated in FIG. 25 specifies only two kinds of attributes for attributes 2515, 2518, 2520 and 2524 and actually, however, includes a plurality of and a lot of attributes such as the attribute 2505. A component such as the component 2501, the component 2502 and component 2503 can include an attribute. FIG. 10 illustrates the management data. However, this FIG. 10 expresses only user information in omission of the directory structure in FIG. 25.

The DN cache illustrated in FIG. 23 is obtained by connecting the DN to the card ID of the above described user information.

For the example illustrated in FIG. 25, two top level components (specifically, the components 2501 and 2511). Those components can be managed by separate directory servers and can be managed by the same directory server. However, the same directory server occasionally cannot manage those components according to the application for the directory server (for example, Active Directory (registered trademark)). Here, the latter management method of one domain for one directory server will be adopted for description. Accordingly, the directory structure illustrated in FIG. 25 is managed by two directory servers, that is, the directory server for managing the domain 2501 and the directory server for managing the domain 2511.

Now, the description on FIGS. 21A and 21B is reinstated.

The step S2103 follows the step S2102 in the case where no card information (card ID) read in the step S2101 is present in the DN cache illustrated in FIG. 23 as a result of the determination in the step S2102.

In the step S2103, the authentication processing functioning part 12 carries out processing for setting search information. Here, since no card ID is stored for the first user authentication, this step will be executed in the case where a user holds an IC card over the MFP 101 for the first time.

FIG. 24 is a schematic diagram exemplifying search information set in the authentication processing functioning part 12 of the MFP 101.

In the step S2103, for example, search information illustrated in FIG. 24 is set. Specifically, the card information (card ID) read in the step S2101 is set for the search condition 2401 of the search information illustrated in FIG. 24. A top level element of a domain is set in the search position 2402. The top level element of the domain being set as the search position 2402 is obtained from the set information (in FIG. 7) stored in the set information part 125 illustrated in FIG. 5. Since the domain is stored here, that domain is converted to a DN. For example, if the domain is set as "com1. local", "DC=com1, DC=local" is adopted. The top level element and the card ID is designated as the search information since it is not known in which position the user corresponding to the card ID is present inside the directory structure illustrated in FIG. 25. Therefore, the procedure of designating the top level element and searching the attributes for all components from the highest ranking is adopted.

An example of search in the case of this setting will be described with FIG. 25.

"Extended attribute=0123456789" will be set as a search condition. "DC=com1, DC=local" will be set as a search position. In the case of this setting, the directory server 104 starts searching from the component 2501 and, subsequently, searches for the extended attribute of the component 2502, the extended attribute of the component 2503 and the extended attribute of the component 2504 in this order to confirm whether the extended attribute of the respective components correspond with the designated conditions. In this case, correspondence of the extended attribute of the component 2504 is established lastly. Therefore, it is regarded that the user is found. The component 2504 and its attribute 2505 are returned as a search result.

That is, the search information illustrated in FIG. 24 designates from which site the search starts in the directory structure illustrated in FIG. 25 and to which condition the search corresponds at the occasion where the authentication processing functioning part 12 searches the directory server 104.

Now, the description on FIGS. 21A and 21B is reinstated.

When the processing in the step S2103 is finalized, the authentication processing functioning part 12 subsequently carries out search detail processing in the step S2104. Specific processing of this search detail processing will be described later with FIG. 22. In this step S2104, search processing is carried out with the search information having been set in the step S2103.

Subsequently, in the step S2105, the authentication processing functioning part 12 determines whether or not user information has been found. This processing is similar to the processing in the step S242 in FIG. 13C.

The step S2117 follows the step S2105 in the case where user information has been found as a result of the determination in the step S2105. On the other hand, the step S2121 follows the step S2105 in the case where no user information has been found as a result of the determination. The processing in the step S2117 and the step S2121 will be described later.

The step S2106 follows the step S2102 in the case where the card information (card ID) read in the step S2101 is present in the DN cache illustrated in FIG. 23 as a result of the determination in the step S2102.

In the step S2106, the authentication processing functioning part 12 obtains a DN corresponding to the card information (card ID).

Subsequently, in the step S2107, the authentication processing functioning part 12 carries out processing for setting the search information illustrated in FIG. 24. Specifically, the DN obtained in the step S2106 is set as the search condition 2401 illustrated in FIG. 24. Nothing is set in the search position 2402 at this occasion. The DN is directly set as the search condition 2401 since it is known in which position the user corresponding to the card ID is present inside the directory structure illustrated in FIG. 25. That is, in this case, both pieces of information of the user name and the search position will be stored as the search condition 2401.

An example of search in the case of this setting will be described with FIG. 25.

Here, "CN=user1, OU=dept1, OU=div1, DC=com1, DC=local" is set as a search condition. Nothing will be set in the search position. In this case, the directory server 104 directly makes an access to the component 2504. The component 2504 and its attribute 2505 are returned as a search result.

Now, the description on FIGS. 21A and 21B is reinstated.

When the processing in the step S2107 is finalized, the authentication processing functioning part 12 subsequently carries out search detail processing in the step S2108. Specific processing of this search detail processing will be described later with FIG. 22. In this step S2110, search processing is carried out with the search information having been set in the step S2107.

Subsequently, in the step S2109, the authentication processing functioning part 12 determines whether or not user information has been found. This processing is similar to the processing in the step S242 in FIG. 13C.

The step S2110 follows the step S2109 in the case where user information has been found as a result of the determination in the step S2109.

In the step S2110, the authentication processing functioning part 12 determines whether or not the card information (card ID) is correct. Specifically, it is determined whether or not the card information (card ID) is correct based on whether or not the card information (card ID) read in the step S2101 corresponds to the attribute for card search of the user information having been found in the step S2109 (for example, the extended attribute illustrated in FIG. 10). This processing is to prevent information of a different user from being obtained in the case where the card ID of the user is changed from the time of the previous cache.

The step S2117 follows the step S2110 in the case where the card information (card ID) is correct (that is, in the case where the card information (card ID) corresponds to the attribute for card search of the user information) as a result of the determination in the step S2110. The processing in this step S2117 will be described later.

On the other hand, the step S2111 follows the step S2110 in the case where the card information (card ID) is not correct (that is, in the case where the card information (card ID) does not correspond to the attribute for card search of the user information) as a result of the determination in the step S2110.

That is, the step S2111 follows one of the step S2110 and the step S2109 respectively in one of the case where the card information (card ID) is not correct as a result of the determination in the step S2110 and the case where no user has been found as a result of the determination in the step S2109. In the step S2109, a conceivable case where no user has been found is, for example, one of change in the position where a user is registered and deletion of the user from the time of the previous cache.

In the step S2111, the authentication processing functioning part 12 deletes the registered DN cache from the DN cache illustrated in FIG. 23. The relevant record is a record corresponding to the card information (card ID) obtained in the step S2101.

Subsequently, in the step S2112, the authentication processing functioning part 12 determines whether or not an upper class is present. Specifically, presence of an upper class component is determined on the DN having been obtained (set) in the step S2106. For example, in the directory server 104, a component 2516 belongs to a class upper than the class which the component 2517 belongs to in the case where the component 2517 is represented by the DN as the directory structure illustrated in FIG. 25. In this case, the upper class is determined to be present. For example, no component belongs to a class upper than the class which the component 2511 belongs to in the case where the component represented by the DN is the component 2511. In this case, no upper class is determined to be present.

The step S2121 follows the step S2112 in the case where no upper class is present as a result of the determination in the step S2112. The processing in this step S2121 will be described later.

On the other hand, the step S2113 follows the step S2112 in the case where an upper class is present as a result of the determination.

In the step S2113, the authentication processing functioning part 12 carries out processing to obtain a DN of an upper class. For example, the processing for obtaining the DN of the component 2516 of "OU=dept2, OU=div1, DC=com2, DC=local" is carried out in the case where the component 2517 of "CN=user3, OU=dept2, OU=div1, DC=com2, DC=local" is represented by the DN.

Subsequently, in the step S2114, the authentication processing functioning part 12 carries out processing for setting search information illustrated in FIG. 24. Specifically, the card information (card ID) having been read in the step S2101 is set as the search condition 2401 illustrated in FIG. 24. The DN of the upper class having been obtained in the step S2113 is set as the search position 2402. The DN of the upper class is set in order to make a search in the vicinity of the previously cached DN. When no user information has been found in the cached DN, the user information is frequently moved one of inside the same class and to a nearby class. Therefore, in order to start searching from the site being near from the position for the previous time, a DN of an upper class is set as the search position 2402.

An example of search in the case of this setting will be described with FIG. 25.

"Extended attribute=444444444" will be set as a search condition. "OU=dept2, OU=div1, DC=com2, DC=local" will be set as a search position. In the case of this setting, the directory server 104 makes an access to the component 2516. The directory server 104 starts searching for components included in the components 2516 respectively in order. In this case, correspondence is established with the component 2519 lastly. Therefore, the component 2519 and its attribute 2520 are returned as a search result.

Now, the description on FIGS. 21A and 21B is reinstated.

When the processing in the step S2114 is finalized, the authentication processing functioning part 12 subsequently carries out search detail processing in the step S2115. Specific processing of this search detail processing will be described later with FIG. 22. In this step S2115, search processing is carried out with the search information having been set in the step S2114.

Subsequently, in the step S2116, the authentication processing functioning part 12 determines whether or not user information has been found. This processing is similar to the processing in the step S242 in FIG. 13C.

The step S2112 is reinstated to carry out search processing on a DN of the upper class again in the case where no user information has been found as a result of the determination in this step S2116.

On the other hand, the step S2117 follows the step S2116 in the case where user information has been found as a result of the determination.

That is, the step S2117 follows one of the step S2116, the step S2110 and the step S2105 respectively in one of the case where the step S2116 determines that user information has been found, the case where the step S2110 determines that the card information (card ID) is correct and the case where the step S2105 determines that user information has been found.

In the step S2117, the authentication processing functioning part 12 carries out processing to cache the DN. Specifically, in order to connect the card information (card ID) to the found user DN (the DN of the management data searched in the search processing in the step S2203 in FIG. 22 to be described later), the respective information is stored in the DN cache illustrated in FIG. 23. In the case where the same card ID is already registered, its user DN is written over.

Subsequently, in the step S2118, the authentication processing functioning part 12 carries out processing for setting MFP login user information. This processing is similar to the processing in the step S245 in FIG. 13C.

Subsequently, in the step S2119, the authentication processing functioning part 12 carries out MFP login processing. This processing is similar to the processing in the step S246 in FIG. 13C.

Specifically, the MFP login user information having been set in the step S2118 is delivered to the MFP 101. The MFP login user information includes, for example, user name, display name, domain, mail and authorization as illustrated in FIG. 11. The operating system of the MFP 101 having received this information cancels operation prohibited setting so as to allow the MFP 101 to operate. This cancellation will enable operation of the operation part 330 in FIG. 5.

Subsequently, in the step S2120, in response to cancellation of the operation prohibited setting, the authentication processing functioning part 12 switches the screen and, for example, causes an MFP use screen 1520 illustrated in FIG. 15 to be displayed. This processing is similar to the processing in the step S247 in FIG. 13C.

Here, the MFP use screen 1520 illustrated in FIG. 15 can also be caused to embed and display the user ID of the login user in order to indicate the user having been logged in. It is also possible to use the user name of the login user for the log for printing and copying, to use mail address information of the login user for transferring scan data and to use authorization of the login user for a function of restricting utilization of the MFP.

The step S2121 follows one of the step S2105 and the step S2112 respectively in one of the case where no user information has been found as a result of the determination in the step S2105 and the case where no upper class is present as a result of the determination in the step S2112.

In the step S2121, the authentication processing functioning part 12 determines whether or not all domains have undergone searching. This processing is similar to the processing in the step S243 in FIG. 13C. Specifically, a plurality of pieces of domain information can be set for the set information and, therefore, it is determined whether or not all domains of the set information illustrated in FIG. 7 have undergone searching. In the case where no user information is present in one directory server, this processing enables searching on the next directory server. For example, in the case where one domain is managed for one directory server, this processing enables searching on a plurality of domains continuously.

The step S204 in FIG. 13A follows the step S2121 in the case where all the domains have not undergone searching (that is, in the case where some domains have not yet undergone searching) as a result of the determination in the step S2121.

On the other hand, the step S2122 follows the step S2121 in the case where all the domains have undergone searching as a result of the determination.

In the step S2122, the authentication processing functioning part 12 carries out an error notifying process. This processing is similar to the processing in the step S244 in FIG. 13C.

When the processing in one of the step S2120 and the step S2122 is finalized, the IC card authentication in the authentication system 100 of the present embodiment is finalized.

Next, search detail processing carried out in the step S2104, the step S2108 and the step S2115 in FIG. 21B will be described with the flow chart in FIG. 22. FIGS. 21A and 21B illustrate so that the search detail processing is carried out only in the authentication processing functioning part 12. However, in further detail, the search detail processing is carried out in the LDAP communication operation part 14 and the LDAP service part 42 in addition to in the authentication processing functioning part 12 as illustrated in FIG. 22.

At first, in the step S2201, the authentication processing functioning part 12 delivers the set search information (FIG. 24) to the LDAP communication operation part 14 to make a search request. This search request grants use of the relevant MFP 101 to the user 200 of the IC card.

Subsequently, in the step S2202, the LDAP communication operation part 14 delivers (transmits) the search information received from the authentication processing functioning part 12 in the step S2201 to the LDAP service part 42 to make a search request. This processing is similar to the processing in the step S236 in FIG. 13C.

Subsequently, in the step S2203, the LDAP service part 42 carries out searching with a component corresponding to the search condition 2401 of the search information illustrated in FIG. 24 as the starting point of the search position in the directory structure stored in the management data memory 43 and illustrated in FIG. 25. This processing is similar to the processing in the step S237 in FIG. 13C. As described above, the management data illustrated in FIG. 10 includes directory structure illustrated in FIG. 25 and is briefly denoted. Therefore, in the step S237 in FIG. 13C uses the management data illustrated in FIG. 10. However, a concept of search position is used in the step S2103, the step S2107 and the step S2114 in FIGS. 21A and 21B, etc. Therefore, the directory structure illustrated in FIG. 25 is used. FIG. 25 is more detailed than FIG. 10 is in structure.

Subsequently, in the step S2204, the LDAP service part 42 replies to the LDAP communication operation part 14, through the network 105, with the management data (FIG. 10) searched in the step S2203 as the management data information. At that occasion, in the case where no relevant management data is present as a result of a search in the step S2203, information to the effect that no relevant management data is present is replied as the management data information to the LDAP communication operation part 14. This processing is similar to the processing in the step S238 in FIG. 13C.

Subsequently, in the step S2205, the LDAP communication operation part 14 delivers the management data information transmitted from the LDAP service part 42 to the authentication processing functioning part 12. This processing is similar to the processing in the step S239 in FIG. 13C.

Subsequently, in the step S2206, the authentication processing functioning part 12 makes a communication disconnection request to the LDAP communication operation part 14. This processing is similar to the processing in the step S240 in FIG. 13C.

Subsequently, in the step S2207, the LDAP communication operation part 14 disconnects connection to the LDAP service part 42. This processing is similar to the processing in the step S241 in FIG. 13C.

Figure 22:
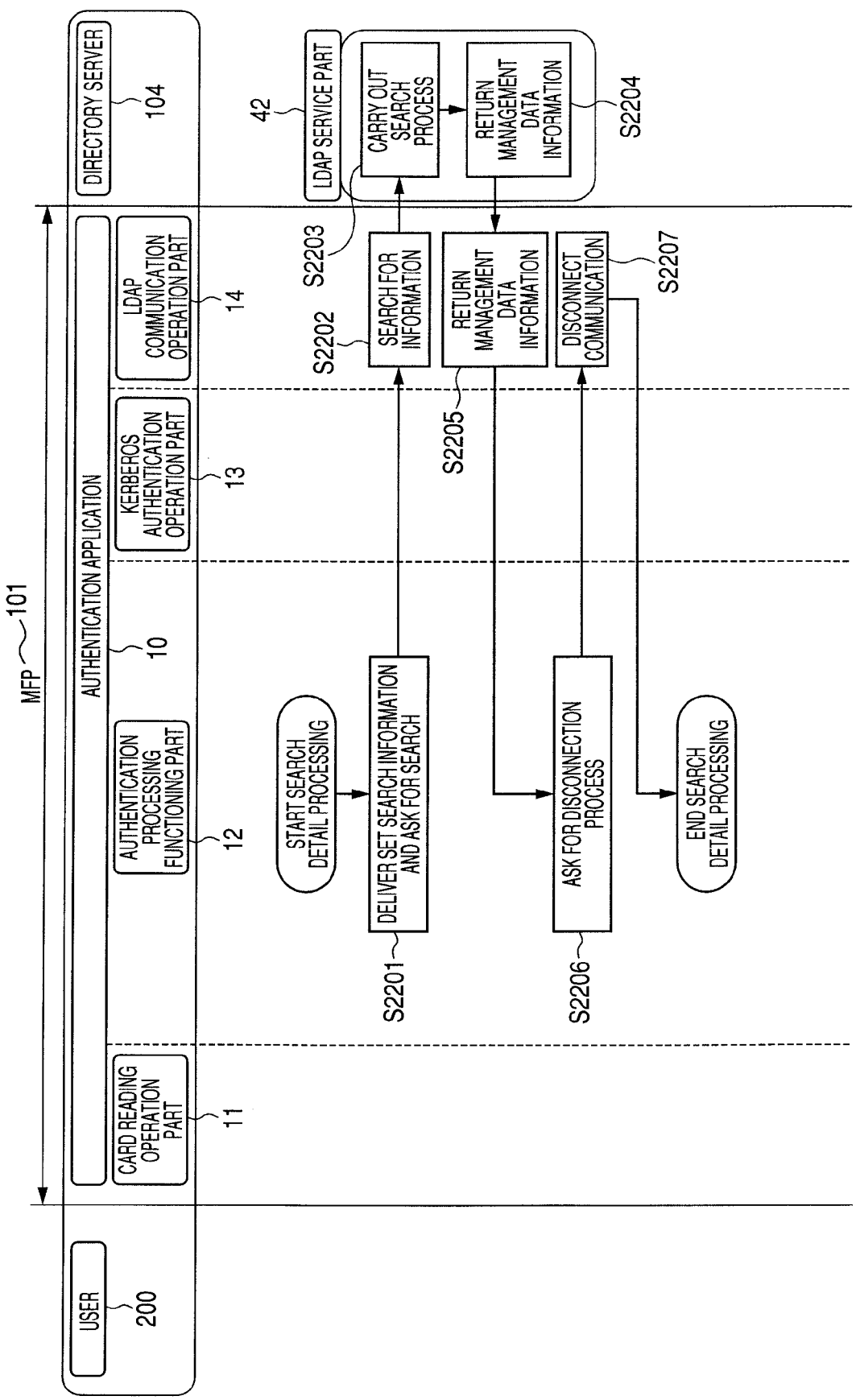
FIG. 22 is a flow chart exemplifying detailed process procedure in the search detail process illustrated in FIGS. 21A and 21B.

Subjected to the processes in the step S2201 to the step S2207 in FIG. 22, the search detail processing (the step S2104, the step S2108 and the step S2115) illustrated in FIGS. 21A and 21B is carried out.

As described above, the MFP (image forming apparatus) 101 of the present embodiment includes the framework as described below.

The authentication processing functioning part 12 obtains the search position for a search for the user identification information of one of card information (user identifying information) illustrated in FIG. 6 and user input information (second login information) illustrated in FIG. 8 in the management data (user management information) illustrated in FIG. 10 inside the directory server 104 (inside the authentication server) (the step S2103 and the step S2107 in FIG. 21A, etc.). The authentication processing functioning part 12 for carrying out this processing for obtaining the search position is included in search position obtaining means.

The authentication processing functioning part 12 transmits the relevant search position and the user identification information of one of the card information (user identifying information) illustrated in FIG. 6 and the user input information (second login information) illustrated in FIG. 8 to the directory server 104 to make a search request (FIG. 22).

Such a framework will enable reduction in authentication time (that is, avoidance of giving rise to an increase in authentication time).

The above described first and second embodiments were described with the IC card authentication with the IC card as a precondition. However, instead of the IC card authentication, fingerprint authentication, for example, can be adopted to use user identifying information for identifying a user. In that case, instead of the card reader 340, for example, in FIG. 3, by applying a fingerprint reader for reading a fingerprint of the user 200, authentication processing will become realizable in the above described first and second embodiments. At this occasion, the fingerprint reader generates a fingerprint image from the relief of the read fingerprint to extract feature point. Information on this extracted feature point is used like the card ID to carry out authentication. That is, a mode of registering feature point information on the fingerprint of the user 200 as one of the extended attribute in the attribute 2505 in FIG. 25 and the extended attribute in FIG. 10 is adopted. Here, fingerprint authentication exemplified authentication as alternative authentication for the IC card authentication. However, biometric authentication such as voiceprint authentication, iris authentication, palm authentication with reflected light of venous-hemoglobin can also be applicable to the mode. That is, the present invention will not limit the form of authentication on the user 200.

The above described first and second embodiments include the directory server 104 (authentication server) to carry out the processes (S217, S218) of the authentication service part 411 and the processes (S220, S221) of the ticket granting service part 412 and, however, can include another server (authentication ticket management server) to carry out processing. In this case, the step S216, the step S219 and the step S310 makes a request to another server (authentication ticket management server).

Respective functioning parts included in the MFP (image forming apparatus) 101 and illustrated in FIG. 5 according to the above described first and second embodiments and respective steps in FIG. 13A through FIG. 13C, FIG. 16A through FIG. 16C, FIGS. 21A and 21B, and FIG. 22 illustrating an authentication method in the relevant MFP 101 are realized by the CPU 301 to execute programs stored in one of the ROM 303 and the HDD 304. The present invention includes computer-readable storage media with this program and the relevant programs recorded therein.

Specifically, the above described programs are provided to a computer by being recorded in storage media such as CD-ROM and otherwise through respective types of transmission medium. Besides the CD-ROM, a flexible disk, a hard disk, a magnetic tape, a magneto-optical disk and a nonvolatile memory card, for example, can be used as the storage media for recording the above described programs. On the other hand, a communication medium in a computer network (such as LAN, WAN such as the Internet and wireless communication network) system for propagating and supplying program information as a carrier can be used as the transmission medium of the above described programs. The communication medium at this occasion includes, for example, wired line such as optical fiber and wireless line.

The present invention will not be limited to such a mode to realize a function of the MFP 101 according to the first and the second embodiments by a computer to execute the supplied programs. In the case where the programs cooperate with one of an OS (operating system) and the other application software running on a computer to realize functions of the MFP 101 according to the first and the second embodiments, the present invention includes such programs. Also in the case of carrying out one of all and a part of processes of the supplied programs with a function enhancement board and a function enhancement unit of a computer to realize functions of the MFP 101 according to the first and the second embodiments, the present invention also includes such programs.

Any of the above described present embodiments only exemplifies embodiment for carrying out the present invention. The technical scope of the present invention should not be interpreted in a limited manner. That is, the present invention can be carried out in various forms without departing from one of its technical thoughts and their main features.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-241391, filed Sep. 18, 2007, and Japanese Patent Application No. 2008-198164, filed Jul. 31, 2008, which are hereby incorporated by reference herein in their entirety.

The invention claimed is:

1. An image forming apparatus communicably connected to a directory server that comprises a directory service part and a ticket service part, the image forming apparatus comprising:

a reading unit, configured to read card information stored in a card;

a login information memory unit, configured to store data based on the read card information as first login information including at least user identification information and a password, which are required for issuance of an authentication ticket by the ticket service part;

an operation unit, configured to accept input information obtained from an input operation by a user as second login information including at least user identification information and a password;

a ticket request unit, configured to request an authentication ticket from the ticket service part using
(a) the first login information stored in said login information memory unit when card authentication is to be performed, and
(b) the second login information when input authentication is to be performed,
wherein the authentication ticket indicates verification of authenticity of the first login information or the second login information;

an authentication request unit, configured to request authentication by the directory service part with the authentication ticket obtained by said ticket request unit;

a search request unit, configured to, when the authentication requested by said authentication request unit is successful,
(a) send the card information to the directory service part and request a search for user management information in the case of the card authentication, and
(b) send the input information to the directory service part and request a search for user management information in the case of the input authentication; and a setting unit, configured to set the user management information searched for by said search request unit as information for logging in to the image forming apparatus, wherein the logging in to the image forming apparatus is performed with
(a) the user management information searched for based on the card information in the case of the card authentication, and
(b) the user management information searched for based on the input information in the case of the input authentication.

2. The image forming apparatus according to claim 1, further comprising:

a first ticket cache unit, configured to cache an authentication ticket obtained with the first login information;

a second ticket cache unit, configured to cache an authentication ticket obtained with the second login information;

a first determination unit, configured to determine whether or not an authentication ticket obtained with the first login information is cached by said first ticket cache unit in the case where said reading unit reads the card information; and a second determination unit, configured to determine whether or not an authentication ticket obtained with the second login information is cached by said second ticket cache unit in the case where said operation unit accepts the input information as the second login information, wherein said authentication request unit requests authentication by the directory service part with a cached authentication ticket in the case where one of said first determination unit and said second determination unit determines that the authentication ticket is cached.

3. The image forming apparatus according to claim 1, further comprising a search position obtaining unit, configured to obtain a search position for searching for the user management information, wherein said search request unit transmits the search position and one of the card information and the input information to the directory service part and thereby requests the search.

4. The image forming apparatus according to claim 1, wherein said ticket request unit requests one of the directory server and an authentication ticket management server to issue the authentication ticket.

5. The image forming apparatus according to claim 2, further including a cache control unit configured to control to
update an authentication ticket cached by one of said first ticket cache unit and said second ticket cache unit in the case where authentication by the directory service part requested by said authentication request unit is successful, and
delete an authentication ticket from one of said first ticket cache unit and said second ticket cache unit in the case where authentication by the directory service part requested by said authentication request unit is unsuccessful.

6. The image forming apparatus according to claim 2, wherein
a plurality of directory servers are communicably connected to the image forming apparatus,
the first login information is made ready for each domain to which one of the directory servers belongs, and
an authentication ticket is cached by said first ticket cache unit for each of the domains and an authentication ticket is cached by said second ticket cache unit for each user.

7. An authentication system comprising:
a directory server comprising a directory service part and a ticket service part;
an image forming apparatus communicably connected to the directory server;
a print server for storing print data; and
a print management server for generating a print data list for each user,
wherein the image forming apparatus comprises:
a reading unit, configured to read card information stored in a card;
a login information memory unit, configured to store data based on the read card information as first login information including at least user identification information and a password, which are required for issuance of an authentication ticket by said ticket service part;
an operation unit, configured to accept input information obtained from an input operation by a user as second login information including at least user identification information and a password;
a ticket request unit, configured to request an authentication ticket from said ticket service part using
(a) the first login information stored in said login information memory unit when card authentication is to be performed, and
(b) the second login information when input authentication is to be performed,
wherein the authentication ticket indicates verification of authentication of the first login information or the second login information;
an authentication request unit, configured to request authentication by said directory service part with the authentication ticket obtained by said ticket request unit;
a search request unit, configured to, when the authentication requested by said authentication request unit is successful, (a) send the card information to said directory service part and request a search for user management information in the case of the card authentication, and
(b) send the input information to said directory service part and request a search for user management information in the case of the input authentication; and a setting unit, configured to set the user management information searched for by said search request unit as information for logging in to said image forming apparatus, wherein the logging in to said image forming apparatus is performed with
(a) the user management information searched for based on the card information in the case of the card authentication, and
(b) the user management information searched for based on the input information in the case of the input authentication, and wherein said print management server outputs, to said image forming apparatus, a print data list of a user allowed to use said image forming apparatus in the directory server at an occasion of processing the print data stored in said print server.

8. The authentication system according to claim 7, wherein said image forming apparatus obtains the print data selected from the print data list from the print server and processes the obtained print data.

9. An authentication method in an image forming apparatus communicably connected to a directory server comprising a directory service part and a ticket service part, the method comprising the steps of:

reading card information stored in a card with reading means;

storing data based on the read card information as first login information including at least user identification information and a password, which are required for issuance of an authentication ticket by the ticket service part;

accepting input information obtained from an input operation of operation means by a user as second login information including at least user identification information and a password;

requesting an authentication ticket from the ticket service part using
(a) the first login information when card authentication is to be performed, and
(b) the second login information when input authentication is to be performed,
wherein the authentication ticket indicates verification of authenticity of the first login information or the second login information;

requesting authentication by the directory service part with the authentication ticket;

when the requested authentication is successful,
(a) sending the card information to the directory service part and requesting a search for user management information in the case of the card authentication, and
(b) sending the input information to the directory service part and requesting a search for user management information in the case of the input authentication; and setting the user management information searched for as information for logging in to the image forming apparatus, wherein the logging in to the image forming apparatus is performed with
(a) the user management information searched for based on the card information in the case of the card authentication, and
(b) the user management information searched for based on the input information in the case of the input authentication.

10. A non-transitory computer-readable storage medium storing a program for causing a computer to execute an authentication method according to claim 9.

* * * * *

UNITED STATES PATENT AND TRADEMARK OFFICE
CERTIFICATE OF CORRECTION

| | | |
|---|---|---|
| PATENT NO. | : 8,312,527 B2 | |
| APPLICATION NO. | : 12/529758 | |
| DATED | : November 13, 2012 | |
| INVENTOR(S) | : Hiroshi Hashimoto | |

It is certified that error appears in the above-identified patent and that said Letters Patent is hereby corrected as shown below:

ON COVER PAGE ITEM (73) ASSIGNEE:

--CANON KABUHSIKI KAISHA-- should read --CANON KABUSHIKI KAISHA--

Signed and Sealed this
Twenty-ninth Day of January, 2013

David J. Kappos
*Director of the United States Patent and Trademark Office*